United States Patent Office 3,793,238
Patented Feb. 19, 1974

3,793,238
SHAPED ARTICLES OF CROSSLINKED URETDIONE POLYURETHANE RESINS AND PROCESS FOR THE PRODUCTION THEREOF
Hans Dieter Winkelmann and Heinrich Rinke, Leverkusen, Harald Oertel, Odenthal-Globusch, and Norbert Weimann, Leverkusen, Germany, assignors to Bayer Aktiengesellschaft, Leverkusen, Germany
No Drawing. Filed Sept. 10, 1971, Ser. No. 179,573
Claims priority, application Germany, Sept. 10, 1970,
P 20 44 838.8
Int. Cl. C08g 22/18, 22/48
U.S. Cl. 260—2.5 AY                   26 Claims

ABSTRACT OF THE DISCLOSURE

Shaped articles of crosslinked polyurethane resins obtained by a process in which a crosslinking reactive component which is a bifunctional NH-compound is caused to act during or after the shaping process on a high molecular weight uretdione group containing polyurethane which is free from NCO groups.

The invention relates to a process for the production of moulded articles of crosslinked polyurethane resins from polyurethanes which contain uretdione groups by the action of reactive components on moulded polyurethane articles.

It is known to react higher molecular weight polyhydroxyl compounds such as polyesters or polyethers and optionally difunctional chain lengthening agents (such as glycols) with uretdione diisocyanates (especially dimeric tolylene-2,4-diisocyanate) or mixtures of uretdione diisocyanates and other diisocyanates such as diphenylmethane-4,4'-diisocyanate in the melt at temperatures below 100° C. in such proportions that practically all the free NCO groups of the diisocyanates are consumed by the reactive hydrogen atoms of the other reactants. The polyurethane compound, which has not yet been crosslinked and which is stable in storage, may be converted into crosslinked polyurethanes by prolonged heating at temperatures above 100° C. to bring about reaction of the uretdione group, for example with urethane groups (German Auslegeschrift No. 1,153,900).

Alternatively, an NCO prepolymer may first be prepared from a polyester which has hydroxyl end groups and an excess of uretdione diisocyanate, and diols or triols, water, aromatic diamines, hydroxyl polyesters or hyroxyl polyethers may then be mixed into the resulting prepolymer and the mixture crosslinked at elevated temperatures (German patent specification No. 1,014,749).

It is also known first to prepare a polyurethane which is stable in storage from a higher molecular weight polyhydroxyl compound, glycol and excess quantities of diisocyanate and subsequently to mix a uretdione diisocyanate into these polyurethanes which contain OH groups by the usual methods. The mixture obtained is relatively stable in storage and the final crosslinked, highly elastic material is obtained from it, only after it has been heated at temperature of from 100° C. to 180° C. to bring about the reaction of the uretdione group with OH and urethane groups (German patent specification No. 968,566).

Alternatively, a polyurethane which has terminal aromatic amino groups (prepared from higher molecular weight polyhydroxyl compound, aromatic diamines and subequivalent quantities of aromatic diisocyanates) may be mixed with a uretdione diisocyanate by a smaller procedure involving addition of the uretdione diisocyanate to the polyurethane on rubber rollers, in such quantities that the free NCO groups are used in less than the amount equivalent to the amino end groups while an overall excess of isocyanate is obtained when the uretdione ring is opened as a result of heating. Due to this isocyanate excess, crosslinking takes place at temperatures above 100° C. with ring-opening of the uretdione ring (German patent specification No. 952,940).

The feature which is common to all the processes described above is that the crosslinking reaction in the moulded polyurethane products which contain uretdione diisocyanates (either incorporated chemically or mixed in) is effected by prolonged heating at a temperature of at least 100° C.

In all the above processes which involve reactions with aromatic uretdione, the choice of reactants should be confined to aromatic diamines, which are only slightly reactive, or even glycols, because aliphatic diamines, which are highly reactive, result in instantaneous and completely uncontrollable crosslinking reactions.

Special procedures have been proposed for the reactions of aliphatic diamines with NCO prepolymers. According to these proposals, reaction of the NCO prepolymers with aliphatic diamines must be carried out at high dilution with highly polar solvents such as dimethyl formamide, and the highly elastic threads or films can only be produced from the solutions of the resulting segmented, substantially linear polyurethanes by removal of solvent (see U.S. patent specification No. 2,929,804).

According to another process, elastomer filaments which are optionally crosslinked by chemical means are produced by spinning difunctional or polyfunctional low molecular weight NCO prepolymers which contain NCO end groups in the form of their melt or solution into aliphatic diamines or polyamines. In this "chemical spinning process" chain lengthening and chain crosslinking processes take place simultaneously with the formation of the threads. Such processes have been described, for example in U.S. patent specifications No. 2,813,775; 2,813,776; 2,935,372; 3,009,762; 3,115,384 and 3,387,071 and in the literature (see Angew. Chemie 74 (1962), pp. 612 to 617).

Technologically, however, these chemical spinning processes entail numerous difficulties since the NCO prepolymers are not stable in storage and, moreover, at the elevated temperatures which are required for their storage and transport, because of their relatively high viscosity they undergo undesirable chemical reactions such as allophanate formation, reactions with traces of moisture and other unwanted reactions. Furthermore, because the prepolymers tend to be sticky, diffculties are encountered in starting the spinning operation, cleaning the pipes and other technical operations in which crosslinking reactions give rise to trouble, e.g. on heated surfaces. In air, the NCO prepolymers undergo crosslinking due to traces of moisture to form insoluble products.

Furthermore, it is difficult to obtain threads with uniform properties by the chemical spinning process because the NCO prepolymers, which have only a low molecular weight, simultaneously undergo linear chain growth, crosslinking and thread formation. Under certain spinning conditions, for example, a skin of polymer may first be formed on the outside while the interior of the thread still remains liquid and of low molecular weight, so that it may subsequently have to be hardened by a reaction with a diamine or water (under pressure: see German Auslegeschrift No. 1,214,356). A controlled cross linking reaction with a clearly defined distance between the points of crosslinking within a polymer chain is practically impossible to achieve.

It is an object of this invention to provide a process for the production of crosslinked shaped polyurethane products, which avoids the disadvantages of the hitherto known processes.

It is another object of this invention to provide a process for the production of crosslinked shaped polyurethane products in which crosslinking takes place at well defined positions within the macromolecule.

Other objects will be evident from the description and the examples.

These objects are accomplished by a process for the production of crosslinked shaped polyurethane products, which comprises causing to act a crosslinking reactive component on a high molecular weight uretdione groups containing polyurethane which is free from NCO groups said crosslinking reactive component being selected from the group consisting of (a) a polyamine, which contains primary or secondary amino groups attached to aliphatic carbon atoms,
(b) a polyfunctional compound which has at least one primary or secondary amino group attached to an aliphatic carbon atom and at least one other group containing a reactive hydrogen atom attached to nitrogen, selected from the group consisting of a hydrazide group, a semicarbazide group, a carbazic acid ester group and an aromatically linked amino group,
(c) a dihydrazide compound selected from the group consisting of a dihydrazide, a bis-semicarbazide, a bis-carbazic acid ester, a hydrazide-semicarbazide, a hydrazide-carbazide acid ester and a semicarbazidecarbazide-carbazic acid ester,
(d) hydrazine, and
(e) mixtures thereof said causing to act being effected during or after the shaping process.

Chemically crosslinked filaments or films, for example, which are insoluble in highly polar solvents such as dimethyl formamide and which, moreover, have exceptionally good elastic properties are thus obtained. Thus, very good values for permanent elongation and, especially important as regards elastic filaments, excellent hydrothermal properties can be achieved to a degree which was hitherto unknown in polyurethane elastomer filaments. The products are differentiated from the linear segmented polyurethane products obtained by the solution condensation process by their substantially improved hydrothermal properties. The spinning process which results in filaments can be carried out much more reliably because the compounds which are put into the spinning process are already high molecular weight polyurethanes which already have filament forming properties. The filament formed in the precipitation baths is crosslinked practically instantaneously by reaction of the aliphatic polyamine in the precipitation bath with the uretdione groups of the polyurethane filament, and the points at which crosslinking takes place in the polyurethane are already determined by the nature and quantity of the uretdione groups built into the molecule. The uretdione rings of the uretdione groups which are within the polyurethane chains are opened by the diamines while the original chain structure is preserved, and these positions therefore determine the points of crosslinking.

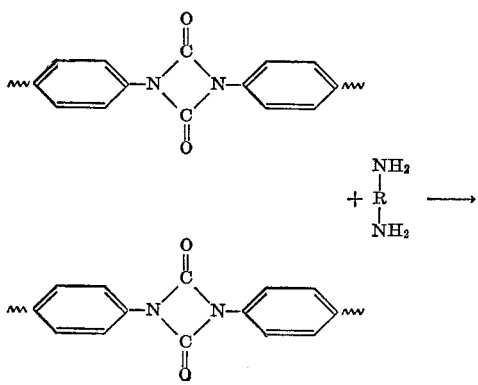

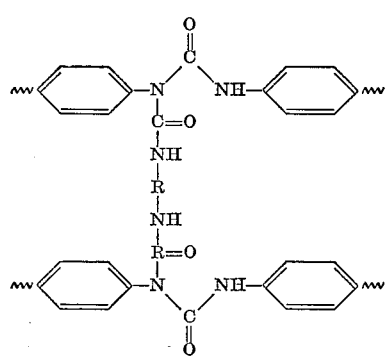

The polyurethanes containing uretdione groups which are used for spinning are preferably put into the spinning process in the form of their solutions. In this form, they are practically stable, are in no way sensitive to moisture, are not sticky and do not undergo chemical changes since they can be stored, transported and worked up into filaments or films at or very near room temperature. These polyurethanes can easily be obtained e.g. in the form of films by precipitation reactions with non-solvents such as water without destruction of the uretdione groups.

Summarizing, it may be said that the new process according to the invention enables crosslinked polyurethane products such as elastomer filaments or films which have excellent elastic and hydrothermal properties to be obtained by a much simpler and more reliable technique.

The shaped polyurethane products are understood to comprise especially filaments or fibres as well as coatings or films, the latter being obtained either in a "nonporous" form which is impermeable to water vapor or in a "microporous" form which is permeable to water vapor, depending on the procedure employed.

The polyurethanes which contain uretdione groups and are substantially free from NCO groups may be obtained by various processes, some of which are already known. For example, substantially linear higher molecular weight polyhydroxyl compounds may be reacted with excess diisocyanates, either diisocyanates which contain uretdione groups or mixtures of such diisocyanates with diisocyanates which are free from uretdione groups, in the presence of low molecular weight chain lengthening agents, preferably dihydric alcohols, at relatively low temperatures (below 100° C.) in the melt, the reactants being used in such proportions that the polyurethane produced is substantially free from NCO groups. Alternatively, an NCO prepolymer may first be prepared, to which the appropriate quantity of low molecular weight chain lengthening agents (for example diols) may be added subsequently until a polyurethane which is practically free from NCO groups and which contains uretdione groups has been obtained (see, for example, the processes according to German patent specifications No. 1,153,900; 1,014,740 and 952,940). These polyurethanes which are stable in storage and which still contain uretdione groups which have not yet been crosslinked can be dissolved in polar solvents such as tetrahydrofuran or better still in highly polar solvents such as dimethyl formamide or dimethyl sulphoxide.

It is much simpler, however, to synthesize the polyurethanes which contain uretdione groups directly in the polar solvents, polyurethane solutions which contain uretdione groups being thus obtained directly. Higher molecular weight polyhydroxyl compounds (optionally with the addition of low molecular weight chain lengthening agents such as dialcohols) may be reacted with uretdione diisocyanates (or mixtures of uretdione diisocyanates and diisocyanates) in solvents such as dimethyl formamide at moderate reaction temperatures (below 80° C.) to produce the polyurethane. Alternatively, polyurethane which is substantially free from NCO groups may be produced by a stepwise reaction, for example by first producing an NCO prepolymer from a higher molecular weight polyhydroxyl compound and diisocyanates which are free from uretdione groups and/or uretdione diisocyanates, the said NCO prepolymer being then subsequently reacted e.g. with dialcohols to produce the polyurethane which is substantially free from NCO groups.

Whereas NCO prepolymers which contain uretdione groups can be reacted in the usual manner with diols and chain lengthening agents to produce a polyurethane which contains uretdione groups, this is no longer possible with more highly reactive chain lengthening agents which contain hydrogen atoms attached to nitrogen, e.g. aliphatic polyamines. Aliphatic amino groups react practically instantaneously with the uretdione group even at room temperature, the reaction resulting in opening of the ring and formation of a biuret derivative (which has a cross-linking function in the polymer) as follows:

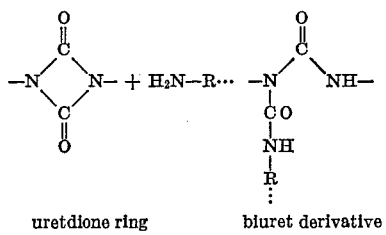

uretdione ring      biuret derivative

If, therefore, an attempt is made to react a linear polyurethane or NCO prepolymer which contains built-in uretdione groups with aliphatic diamines as chain lengthening agents, solutions which are capable of being worked up into shaped products can no longer be obtained because the polyurethanes undergo crosslinking.

Polyurethanes which are required to contain hard urea segments (obtained by reacting NCO prepolymers and diamines) which are especially advantageous for the elastic properties must be prepared by modified procedures. For this reason, a polyurethane urea which contains terminal OH groups and is free from uretdione groups and which is not yet a high molecular weight compound is first synthesized, and it is only this compound which is then reacted with uretdione diisocyanates (or NCO prepolymers) to produce a high polymer polyurethane urea which contains uretdione groups. This may be achieved, for example, by reacting a higher molecular weight polyhydroxyl compound with a diisocyanate which is free from uretdione groups and an aliphatic diamine in highly polar solvents such as dimethyl formamide or dimethyl acetamide, the molar ratio of hydroxyl groups plus amino groups to NCO groups being invariably chosen so as to be greater than 1 and preferably between 1.001 and 3.0. In order to prevent the formation of a significant amount of sparingly soluble polyureas from the diisocyanate and the diamine, the diamine is introduced very slowly into a solution of polyhydroxyl compound and diisocyanate in highly polar solvents. This method yields clear solutions of the moderately high molecular weight polyurethane urea which contains OH end groups, and this compound is then reacted with uretdione diisocyanates (in approximately equivalent quantities) so as to produce high molecular weight uretdione polyurethane.

When aminoalcohols are used as chain lengthening agents for the production of polyurethane ureas, again a solution of higher molecular weight polyhydroxyl compound and aminoalcohol in a highly polar solvent such as dimethyl formamide or dimethyl sulphoxide is reacted with a quantity of diisocyanate which contains uretdione groups which is at least equivalent to the quantity of amino groups. Here again the molar ratio of hydroxyl plus aminohydroxyl component to the diisocyanate component must be greater than 1. After this reaction to produce a moderately high molecular weight polyurethane urea which has OH end groups, the high molecular weight uretdione polyurethane is prepared by the addition of a uretdione diisocyanate (or NCO prepolymer).

Instead of aliphatic diamines or aminoalcohols, the less highly reactive aromatic diamines, araliphatic diamines, hydrazine or alkyl-substituted hydrazines, dihydrazides or other chain lengthening agents having NH-functions such as bis-semi-carbazides, bis-carbazic acid esters, aminohydrazides, aminosemi-carbazides, aminocarbazic acid esters, semi-carbazide hydrazides or carbazic acid ester semicarbazides may be used in the same manner in order first to produce polyurethane precondensates which have OH end groups and built in urea-like hard segments.

Aromatic diamines are in a certain hybrid position as regards their reactivity since their amino groups have so little reactivity that they attack the uretdione ring only after some considerable time at elevated temperatures. It is, therefore, possible to react aromatic diamines only subsequently with uretdione NCO prepolymers under moderate reaction conditions (e.g. in dimethyl formamide at room temperature) to produce chain lengthened polyurethane provided an excess of amino groups with respect to the free NCO groups is avoided. If, however, the quantity of amino groups used is in excess of the free NCO groups, the amino groups may react slowly with the uretdione groups so that the viscosity increases or the solution changes to a cross-linked ("jelly-like") state.

In the case of dihydrazide compounds such as carbodihydrazide, it is also possible, owing to their lower reactivity with uretdione groups, to carry out a chain lengthening reaction with NCO prepolymers which contain uretdione groups in the chain if the necessary precautions are taken. Thus, for example, NCO prepolymers which contain uretdione groups may be synthesized from higher molecular weight polyhydroxyl compounds (optionally in the presence of low molecular weight diols) with a molar excess of diisocyanates (e.g. a mixture of uretdione diisocyanates and diisocyanates which are free from uretdione groups) in the melt or in solvents, and these prepolymers may then be chain lengthened with dihydrazides in solution. An excess of hydrazide groups over free NCO groups (which react very preferentially with hydrazides) should be avoided in order to prevent an unwanted reaction of the hydrazide compounds with uretdione groups at this stage. This may be ensured e.g. by introducing an equivalent or subequivalent quantity of dihydrazide compounds in the form of a solution into the solution of uretdione NCO prepolymers at or very close to room temperature and thoroughly mixing the components. The required NCO/hydrazide chain lengthening reaction is thus achieved without any unwanted side reactions.

Other modifications of the method of carrying out the reaction may, of course, be applied for preparing polyurethane derivatives which contain uretdione groups, but care must be taken to ensure by suitable control of the reaction conditions that the uretdione groups in the polyurethanes will not be involved in the reaction, or only to a minor extent, so that the reaction products obtained will be uretdione-containing polyurethanes which are still soluble in polar or highly polar solvents.

The amount and distribution of the uretdione groups within the polyurethane have some effect on the properties of the shaped products which are crosslinked by the process according to the invention since the crosslinking reaction takes place on the uretdione groups. If, for example, a mixture of ordinary diisocyanate and diisocyanate which contains uretdione groups ("dimeric diisocyanate") is used for the synthesis of the polyurethane, the diisocyanate will be found to have a statistical distribution within the polyurethane which corresponds to the NCO reactivity. If the reaction is carefully controlled, the uretdione diisocyanate may be deliberately fixed to a great extent within the chains or at the chain ends.

The uretdione polyurethanes obtained by this process are substantially linear substances with more or less elastic properties. If no hard segments are incorporated (e.g. reaction of higher molecular weight polyhydroxyl compounds with uretdione diisocyanates or mixtures thereof with the usual diisocyanates), the products obtained are relatively low melting uretdione polyurethanes which may in some cases be soluble in solvents such as acetone, ethyl acetate, methyl ethyl ketone, tetrahydrofuran or dioxane and which do not have very good elastic properties. If, however, the uretdione polyurethanes still contain considerable quantities of hard segments, especially

NH.CO—NH groups, then they are relatively high melting substances which are only soluble in highly polar solvents such as dimethyl formamide or dimethyl acetamide, dimethyl sulphoxide or tetramethyl urea and they will already have good elastic properties.

The molecular weights of the uretdione polyurethanes as identified by their intrinsic viscosity $\eta_i$ in 1% hexamethyl phosphoramide solution at 20° C. vary within wide limits of about 0.35 to 2.5, and preferably lie within the range of 0.4 to 1.5. An $\eta_i$ range of 0.5 to 1.25 has been found to be especially suitable. In accordance with these molecular weights, the solution viscosities of these uretdione polyurethane solutions are between about 1 and 3000 poises. For the subsequent working up of the solution into shaped products, however, a viscosity of 10 to 1000 poises, and preferably 10 to 700 poises, at concentrations of between about 10 and 35% (preferably 17 to 25%) has been found to be especially suitable.

In order to achieve sufficient modification of the properties of the uretdione polyurethanes in the subsequent reaction with the crosslinking reagents (e.g. aliphatic diamines), the uretdione group content should not fall below a certain level. The polyurethanes should, therefore, contain at least 0.05 equivalent of uretdione groups per kg. of solid polyurethane. Satisfactory results are obtained with uretdione group contents of 0.10 to 1.2 equivalents per kg., and 0.2 to 1.0 equivalent per kg. are especially advantageous.

Mixtures of polyurethanes which are free from uretdione groups and uretdione polyurethanes may be prepared by mixing any polyurethane solutions and these may then be treated by the process according to the invention. The features mentioned above may then be applied accordingly to these mixtures.

Suitable uretdione diisocyanates ("dimeric" diisocyanates) are in principle any diisocyanate dimers, but, on account of their more advantageous reactivity, it is especially suitable to use those uretdiones in which the uretdione groups are attached to aromatic nuclei, e.g. the dimeric compounds of diphenylmethane-4,4'-diisocyanate,
diphenylmethane-2,4'-diisocyanate,
3,3'-dimethyl-4,4'-diphenylmethane-diisocyanate,
4-methyl-diphenylmethane-3,4'-diisocyanate,
2,5-dimethyl-diphenylmethane-4,4'-diisocyanate,
diphenyl-4,4'-diisocyanate,
4-phenoxy-3-isocyanato-phenyl-isocyanate,
4-methoxy-3-isocyanato-phenyl-isocyanate,
4-ethoxy-3-isocyanato-phenyl-isocyanate,
4-propoxy-3-isocyanato-phenyl-isocyanate,
4-chloro-3-isocyanato-phenyl-isocyanate,
4-methyl-3-isocyanato-phenyl-isocyanate ("dimeric tolylene-2,4-diisocyanate"),
3-methyl-4-isocyanato-phenyl-isocyanate,
4-ethyl-3-isocyanato-phenyl-isocyanate,
4-(β-isocyanato-ethyl)-phenyl-isocyanate,
1,2,3,4,5,6-hexahydro-diphenylmethane-4,4'-diisocyanate,
3-isocyanato-phenyl-isocyanate,
4-(β-isocyanato-β-methyl-ethyl)-phenyl-isocyanate,
α-(1-isocyanato-cyclohexyl)-p-tolyl-isocyanate,
3,3',5,5'-tetrachloro-diphenyl(methane)-4,4'-diisocyanate,
3,3',5,5'-tetramethyl-diphenyl(methane)-4,4'-diisocyanate and
diphenyl-dimethylmethane-4,4'-diisocyanate.

The dimeric diisocyanates are either known compounds or can be obtained by known processes. The uretdione group is generally formed from the more reactive NCO group which is not sterically hindered in the case of asymmetric substitution of diisocyanates, or in the case of aromatic/aliphatic diisocyanates, it is obtained by dimerization of the aromatic NCO group. Uretdione diisocyanates which contain several uretdione groups and which are obtained by dimerization reactions from diisocyanates which contain equally reactive NCO groups, e.g. diphenylmethane-4,4'-diisocyanate, may also be used. Alternatively, the uretdione group may be formed in situ in the NCO prepolymers, e.g. as described in German Offenlegungsschrift No. 1,445,721. Uretdione diisocyanates which are especially suitable are dimeric tolylene-2,4-diisocyanate, dimeric diphenylmethane-4,4'-diisocyanate and diphenylmethane-2,4'-diisocyanate.

The uretdione group may, however, also be built into the polyurethanes via functional groups other than the NCO groups of diisocyanates. For example, aromatic diamines such as:

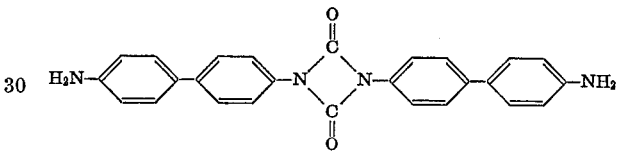

may be reacted with NCO prepolymers in the usual form. Numerous other such aromatic uretdione diamines as well as numerous uretdione diisocyanates are mentioned in the contribution in "Analytical Chemistry of the Polyurethanes," vol. 16/III, High-Polymers Series (Wiley 1969).

Compounds which contain hydroxyl groups (preferably aliphatic hydroxyl groups) and uretdione groups in the molecule are also suitable components for the preparation of polyurethanes which contain uretdione groups, e.g. the following:

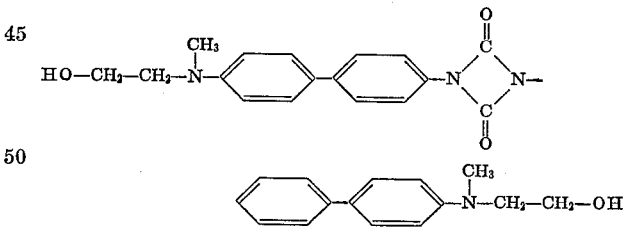

Any of the usual starting materials and methods of preparation may be used in suitable combinations for the synthesis of the polyurethanes according to the invention.

Suitable for use as higher molecular weight, substantially linear polyhydroxyl compounds are in principle any compounds which have a molecular weight of between about 400 and 5000 (preferably 500 to 2500) and which have melting points below about 70° C. (preferably below 45° C. and most suitably below room temperature), and in which most of the hydroxyl groups are in the end positions. Such compounds are, for example, polyesters, polyethers and polycarbonates which have terminal hydroxyl groups of the type customarily used for polyurethane elastomers; such compounds are indicated e.g. in the patent specifications mentioned below (see page 23).

Polyesters, for example, may be prepared from adipic acid and/or phthalic acid and/or isophthalic acid and/or terephthalic acid and/or maleic acid with excess quantities of polyalcohols. It is especially suitable to use dialcohols or mixtures of dialcohols such as ethylene glycol, 1,2-propylene glycol, 1,4-butane diol, 1,6-hexane diol, diethylene glycol, 2-methylhexane diol, 3-methylhexane diol, 1,4-bis-hydroxymethyl cyclohexane, 2,2-dimethyl propane-1,3-diol, 2,2-dimethylhexane-1,3-diol or 2-ethyl-hexane-1,3-diol for the esterification with adipic acid. Suitable polyesters may also be obtained by reacting caprolactone with sufficient quantities of dialcohols or amines to start the reactions. Especially suitable polyethers among the polyalkylene ethers are polytetramethylene ethers and polypropylene glycols. Polycarbonates are prepared by reacting diphenyl carbonate with diols or mixtures of diols, especially hexane-1,6-diol-bis-(hydroxyethyl ether) or bis-ω-hydroxyhexyl adipate. The polyesters may, of course, also contain ether, amide or carbonate groups, for example by reacting them with diols which contain ether groups such as ω,ω'-dihydroxy dibutyl ether, aminoalcohols such as aminoethanol or bis-(ω-hydroxyhexyl) carbonate. Any mixtures of polyhydroxyl compounds may also be used.

The polyhydroxyl compounds may also be reacted with the diisocyanates together with low molecular weight dialcohols (molecular weights up to 500) as chain lengthening agents to produce the NCO prepolymer. The organic diisocyanates may be any of the conventional aliphatic, cycloaliphatic, araliphatic, aromatic or heterocyclic diisocyanates. Isomeric tolylene-2,4- and -2,6-diisocyanates or mixtures thereof, diphenyl-4,4'-diisocyanate, p-phenylene diisocyanate, diphenyl-4,4'-diisocyanate, diphenyl ether-4,4'-diisocyanate, hexamethylene diisocyanate, isophorone diisocyanate, m-xylylene diisocyanate and stereoisomeric 4,4'-dicyclohexylmethane diisocyanates used in the form of any mixtures of these compounds are especially suitable.

The suitable uretdione diisocyanates (dimeric diisocyanates) have already been listed above. Uretdione diisocyanates may be used as the only diisocyanate but alternatively uretdione diisocyanates and diisocyanates which are free from uretdione groups may be used together or in successive stages. In that case, the proportion of uretdione diisocyanate to diisocyanate should be at least 5:95 and is preferably more than 10:90 and most advantageously in the region of 20:80 to 80:20.

The following are mentioned as examples of suitable chain lengthening agents which have active hydrogen atoms:

(A) Low molecular weight dialcohols (which may already be used for the formation of the NCO prepolymer): ethylene glycol, diethylene glycol, triethylene glycol, propane-1,2-diol, propane-1,3-diol, 3-chloropropane-1,2-diol, butane-1,4-diol, butane-2,3-diol, 2-methylpropane-1,3-diol, hexane-1,6-diol, 2,2-dimethyl-propane-1,3-diol, 3-methylpentane-2,4-diol, 2,2,4-trimethylhexane-1,6-diol, butene-2-diol-(1,4), N-methyl-diethanolamine, hydroquinone-bis-β-hydroxyethyl-ether, bis-(2-hydroxyethyl)-terephthalate, N-methyl-bis-(β-hydroxypropyl) - amine and 2-methylene propane-1,3-diol;

(B) Low molecular weight aminoalcohols, e.g. 2-aminoethanol, 2-methylaminoethanol, 3-aminopropanol, 1-aminopropanol-(2), 2-amino-2-methylpropanol-(1);

(C) Low molecular weight aliphatic diamines, e.g.: ethylene diamine, 1,2-diaminopropane, 1,3-diaminopropane, 1,4-diaminobutane, 1,3-diaminobutane, 2,3-diaminobutane, 1,6-diaminohexane, 2,2,4-trimethyl-hexamethylene-1,6-diamine, 1,8-octamethylene diamine, 1,12-dodecamethylene diamine and N,N'-dimethylethylene diamine;

(D) Cycloaliphatic diamines, e.g.: 1,3-diaminocyclohexane, 1,4-diaminocyclohexane, 4,4'-diaminodicyclohexylmethane, 1-methyl-2,4- (or -2,6)diaminocyclohexane, 4,4'-diamino - 3,3' - dimethyl-dicyclohexylmethane and 1-aminomethyl-5-amino-1,3,3-trimethyl-cyclohexane;

(E) Aromatic diamines, e.g.: 1,3 - diaminobenzene, 1,4-diaminobenzene, 4 - chloro - 1,3-diaminobenzene, 4-nitro-1,3 - diaminobenzene, 4-aminodiphenylamine, 2,5-dichloro - 1,4 - diaminobenzene, 2,4-diaminotoluene, 2,6-diaminotoluene, 1,5 - diaminonaphthalene, 4,4'-diaminodiphenyl, 2,2'-dichloro-4,4'-diaminodiphenyl, 3,3'-dichloro-4,4'-diaminodiphenyl, 4,4' - diamino-diphenylmethane, 3,3'-dichloro-4,4'-diamino-diphenylmethane, 4,4'-diamino-3,3' - dimethyldiphenyl, 2,2' - bis-(4-aminophenyl)-propane, 4,4'-diamino-diphenyl sulphide and 4,4'-diamino-diphenyl ether;

(F) Aliphatic/aromatic diamines, e.g.: 3 - aminomethyl aniline, 4-(2 - aminoethyl)-aniline, 1,2,3,4-tetrahydronaphthalene-1,5-diamine and 1,2,3,4,5,6 - hexahydrodiphenylmethane-4,4'-diamine;

(G) Isocyclic diamines, e.g.: 1,3-bis-aminomethylbenzene, 1,4 - bis - aminomethylbenzene, 1,3-bis-aminomethyl-4,6-dimethylbenzene;

(H) Hydrazine derivatives, e.g. hydrazine, methyl hydrazine and N,N'-dimethyl hydrazine;

(I) Aliphatic and aromatic acid hydrazides and hydrazide derivatives such as carbodihydrazide, succinic acid dihydrazide, malonic acid dihydrazide, glutaric acid dihydrazide, adipic acid dihydrazide, terephthalic acid dihydrazide, isophthalic acid dihydrazide and β-semicarbazide propionic acid hydrazide;

(J) Aliphatic and aromatic aminohydrazide derivatives, e.g.: aminoacetic acid hydrazide, 3-amino-propionic acid hydrazide, 3-methylamino-propionic acid hydrazide, 6-amino-caproic acid hydrazide, 11-amino-undecanoic acid hydrazide, 3-amino-benzoic acid hydrazide, 4-amino-benzoic acid hydrazide, 4-amino-phenyl semicarbazide and β-aminoethyl-semicarbazide;

(K) The chain lengthening agent used may also be water.

The chain lengthening agent used is preferably ethylene diamine, m-xylylene diamine, hydrazine, carbodihydrazide or β-semicarbazido-propionic acid hydrazide. The choice of chain lengthening agent is not restricted to the examples mentioned above and, moreover, mixtures containing various chain lengthening agents in any proportions may be used. Their reaction is preferably carried out in solvents such as dimethyl formamide, dimethyl acetamide, dimethyl sulphoxide or N-methyl-pyrrolidone. Other methods of procedure which have not been described in the above description or in the examples may be found in numerous publications, e.g. in German Offenlegungsschriften No. 1,695,147 and 1,495,830, German Auslegeschrift No. 1,183,196, German patent specifications Nos. 1,123,154, 1,123,467 and 1,157,386; Belgian patent specification No. 734,194 and U.S. patent specifications Nos. 2,929,803, 2,529,804 and 2,957,852.

The uretdione polyurethanes may be worked up into shaped products by known processes. These products may be produced first and then treated with the reactive components at any time thereafter or they may be produced and treated with the reactive components at the same time. Polyurethane solutions which contain uretdione can be spun to threads by the wet or dry spinning process through single aperture or multi-aperture spinning dyes. If a flat sheeting die is used, the products obtained are either nonporous or microporous foils. If the solutions are applied to a support, transparent nonporous films are obtained after evaporation of the solvent at about 100° C. If the coats of polyurethane containing solvent are exposed to a moist atmosphere for a short time and the film is then coagulated by immersion, e.g. in water, the resulting films are microporous. The solutions can be applied to textile supports, elastomer coated textiles or fleeces being obtained after evaporation of the solvents.

Threads, foils or coatings produced by these methods are still readily soluble in polar solvents. The uretdione structure is still completely preserved in the polyurethanes, as can easily be demonstrated by the IR spectrum. The elastic properties of the samples, however, are in some cases very moderate due to their chemical structure and often their insufficiently high molecular weight. Treatment with polyfunctional reactive components, e.g. aliphatic diamines, results in crosslinked polymers which have considerably modified properties, one of the most noticeable of which is the loss of solubility in highly polar solvents.

The subsequent crosslinking action of reactive components on the moulded products of uretdione polyurethanes may be effected in various ways. For example, the products may be exposed to ethylene diamine vapors, although it is preferable to use the reactive components in a liquid form and preferably in the form of a solution. Thus, for example, the reactive components acting on the filaments, foils or coatings may be in the form of dilute solutions, e.g. at concentrations of 0.001% to about 50%, and preferably 0.1% to 10%, in organic solvents such as hydrocarbons, alcohols, esters, ketones or chlorinated hydrocarbons such as methanol, benzene, dioxane, aqueous dimethyl formamide or dimethyl acetamide or in water. Even a very short treatment of about 0.1 to 10 seconds may be sufficient for thin filaments or foils but longer reaction times, e.g. of up to 200 minutes, may be employed according to the concentration of the baths and the reactivity of the components, and the temperature may be increased, e.g. to 80° C. In order to obtain sufficiently deep penetration of the reactive components, it is advantageous to swell the uretdione polyurethanes with solvents such as alcohols, for example methanolic solutions of aliphatic diamines in concentrations of 0.025 to 25% by weight may be used. The special advantage of aliphatic polyamines as reactive components is that crosslinking will take place even at very low concentrations of reactive components and at very low temperatures.

In the case of less reactive components which are not claimed for the invention, for example aromatic diamines, crosslinking of the polyurethanes can only be achieved by prolonged heating of the polyurethanes in solutions of these reactive components or prolonged and thorough heating in the presence of such diamines.

If the concentration of reactive components is increased too much, e.g. when using liquid polyamines as crosslinking baths, the properties of the crosslinked polyurethanes may in some cases be impaired because reaction of some of the uretdione groups with a diamine may take place side by side with the crosslinking reaction due to the excess amount of amino groups present, and the resulting aminoalkyl biuret derivative is then unable to undergo the required crosslinking reaction with another uretdione group. This side reaction manifests itself clearly as a reduction in the density of crosslinking in the shaped product. In the process described here, the optimum concentration and reaction time of the reactive components must first be determined by simple preliminary tests since diffusion processes, among others, have a large effect on the density of crosslinking (the reactive component is always offered in excess from outside).

Subsequent rapid crosslinking can be obtained e.g. on filaments by crosslinking e.g. with aliphatic polyamine in one of the washing baths following the wet spinning process or by carrying out this reaction together with application of the textile dressing on the threads. Subsequent crosslinking may also be carried out in the wet coagulation process used for the production of microporous films or coating (e.g. for synthetic leather). In this case, for example, solutions may be coagulated in aqueous precipitation baths after they have been painted on supports and possibly gelled by the action of vapors of non-solvents (e.g. moist atmosphere). The resulting microporous structure consisting of the polyurethane layer which is still swelled may be crosslinked, at least superficially, in a subsequent bath which contains small concentrations of reactive components. The microporous structure is thus stabilized and is no longer liable to collapse into a nonporous film on drying. In addition, these microporous polyurethanes have become insoluble and remain microporous even in the presence of solvents, e.g. in the case of adhesive compounds, and even under tension (e.g. on shoe lasts).

Homogeneous uretdione polyurethane films or foils which are free from solvent can also be easily crosslinked by means of reactive components at any time after they have been produced. Films (produced by drying in a drying cupboard) become insoluble in dimethyl formamide within a few minutes when placed in dilute aqueous or methanolic diamine solutions (e.g. methanolic metaxylylene diamine solutions).

The extent to which a reactive component can act from outside on a shaped product of considerable thickness is, of course, limited. On the other hand, the marginal zones can be completely crosslinked. Polyurethane layers which were previously homogeneous can be crosslinked to a thickness of about 1 mm., and even this does not constitute the limit. Considerably deeper crosslinking effects can be obtained if the polyurethane is at the same time exposed to the action of swelling agents.

The crosslinking of uretdione polyurethanes by means of reactive components such as aliphatic polyamines can be carried out not only after the polyurethane has been worked up into a shaped product but may advantageously also be carried out directly during the shaping process. A characteristic example of this is the spinning of uretdione polyurethane solutions into precipitation baths which contain the reactive components. In this case, the filament formed by coagulation in the precipitation bath is crosslinked at the same time and practically immediately by the action e.g. of aliphatic polyamines, and filaments with substantially improved properties are obtained. Here again it is advantageous to use dilute solutions of the reactive components in various types of organic solvents but preferably in aqueous solvent mixtures or in water. The reactive components are advantageously used in concentrations of 0.001% to 50%, but preferably 0.1% to 25%. Concentrations of between 0.5% and 10% are especially advantageous. The temperatures of the precipitation bath are in the region of about 0° C. to 80° C., preferably +10° C. to 70° C. In the case of aliphatic polyamines, room temperature is quite high enough and the reaction still proceeds sufficienty rapidly even below 0° C. The precipitation baths preferably contain at least 50% of water but a filament can also be obtained by spinning dimethyl formamide/polyurethane solutions into 1% dimethyl formamide/diamine solutions. This confirms the very rapid crosslinking process. The time of contact with the reactive components is determined by the length of the precipitation bath and the draw-off rate and by the subsequent baths. The time is between 0.1 and 1000 seconds, in most cases between 1 and 100 seconds. Longer contact times, e.g. of up to 200 minutes, are possible in some cases, e.g. if the spools are left in an after-treatment vessel containing reactive components. Since, however, filaments are usually spun from multi-aperture dies and have a relatively fine individual titre of about 1 to 20 dtex., the filaments are so fine that a fairly short contact time is generally sufficient for the complete reaction. When polyurethane solutions which have been pregelled in a moist atmosphere and painted on a surface are coagulated in coagulation baths, a special advantage can be obtained by simultaneously carrying out an instant crosslinking at least of the surface of the resulting microporous structure by the presence of, in some cases, very low concentrations of reactive component, e.g. 0.025% of diamide. When this procedure is adopted, there are obtained not only the advantages already described above of resistance to solvents, improved properties and stability of the microporous structurs on drying, but the surface of the crosslinked microporous foil also has a much more uniform, smooth structure without the formation of craters or an "orange peel effect." Such uniform surfaces are very valuable for films used as covering layers for synthetic leather.

Here again, sufficient crosslinking can be achieved within a very short reaction time with about 0.001 to 50% by weight, preferably 0.01 to 10% by weight, of reactive component in aqueous precipitation baths which optionally contain up to 50% by weight of organic solvents which are miscible with water, e.g. mixtures of DMF and water in the proportions of 60:40 to 1:99. Since the quantity of uretdione groups is relatively small compared with the volume of the bath, even smaller quantities of reactive components such as aliphatic polyamines are sufficient if the contact time is slightly increased. The thickness of the layer of polyurethane solutions applied is generally less than 3 mm. and preferably between 0.05 and 1.5 mm. Specific effects can be achieved by using a combination of baths of different concentrations (optionally different reaction components at different temperatures) along a continuous stretch of coagulation and after-treatment apparatus. Further modification and additional crosslinking of the foils can, of course, be achieved with reactive component in one of the subsequent baths.

Suitable reactive components for the reaction with polyurethanes which contain uretdione groups include any difunctional or polyfunctional compounds which have at least one primary or secondary amino group attached to an aliphatic carbon atom and optionally one further NH-reactive group. Thus, for example, any of the following compounds may be used: any aliphatic diamines such as ethylene diamine, dimethylformamide, N,N'-dimethylethylene diamine, 1,2-diaminopropane, 1,3-diaminopropane, 1,4-diaminobutane, 2,3-diaminobutane, 1,6-diaminohexane, 1,12-diaminododecane, 2,2,4-trimethylhexamethylene-1,6-diamine, bis-(3-aminopropyl)-methylamine; aliphatic diamines such as bis-(2-aminoethyl)-amine, N,N'-bis-(2-aminoethyl)-ethylene diamine, 1,11-diamino-3,6,9-triazaundecane, dipropylene-(1,2)-triamine, bis-(3-aminopropyl)-amine; cyclic diamines (as pure stereoisomers and any mixtures thereof), e.g. 1,3- (or 1,4-) diaminocyclohexane, 1-methyl-2,4- (or 2,6-) diaminocyclohexane, 1-aminomethyl-5-amino-1,3,3-trimethyl-cyclohexane, 4,4'-diamino-dicyclohexylmethane, 4,4'-diamino-3,3'-dimethyl-dicyclohexane, 1,3,5-triamino-cyclohexane; isocyclic diamines, e.g. 1,3- (or 1,4-) bis-aminomethylbenzene, 1,3-bis-aminomethyl-4,6-dimethylbenzene, 1,4-bis-(aminoethyl)-benzene; heterocyclic diamines, e.g. piperazine, N,N'-bis-γ-aminopropyl piperazine, piperazine-N-(2-aminoethyl)-piperazine, 2,5-dimethyl-piperazine; diaminoalcohols such as 1,3-diamino-propanol-(2), 2-(2-aminoethylamino)-ethanol-(1) and 3-(2-aminoethylamino)-propanol-(1).

It is preferable, however, to use primary aliphatic cycloaliphatic or isocyclic diamines of the type which have up to 13 carbon atoms, such as ethylene diamine, 1,2- (or 1,3-) diaminopropane, 1,4 - diaminobutane, 1,6 - diaminohexane, 1,12-diaminododecane, 1,4- (or 1,3-) diaminocyclohexane, 4,4'-diamino-dicyclohexylmethane or 1,3- (or 1,4-) bis-amino-methylbenzene. Apart from diamines and polyamines, any compounds which have a primary or secondary amino group attached to an aliphatic carbon atom and one or more groups with reactive hydrogen atoms attached to nitrogen may be used as reactive components. NH-reactive groups which are especially suitable are the hydrazine group $CONHNH_2$, the semi-carbazide group $NHCONHNH_2$, the carbazic acid ester group $OCONHNH_2$ and the aromatically linked amino group $ArNH_2$ or $ArNRH$ (R=alkyl). These compounds differ from the diamines and polyamines in that the aliphatic amino groups and the other reactive NH groups have different reaction rates. The aliphatic amino group invariably reacts very much more rapidly. This also applies to hydrazine, in which the first amino group reacts very rapidly like an aliphatic amine but which in the second stage reacts much more slowly as a semicarbazide derivative. Due to the different reaction rates in the above reactants, some of the uretdione groups in the polyurethane enter very rapidly into a reaction with the aliphatic amino group, whereas the subsequent NH-reactive group which is fixed to the polyurethane reacts more slowly with the remaining uretdione groups in the molecule. For this reason, a very brief contact time in the solutions of these reactive components is generally sufficient for fixing the reactive components to the polyurethane but the polyurethane is in most cases not yet sufficiently crosslinked; it is only in the course of subsequent storage or reheating that the NH-reactive group then continues to react to bring about crosslinking of the polyurethane. Here again, the usual concentrations of reactive components are sufficient, the concentrations being preferably between 0.1 and 10% by weight. The following are examples of suitable reactive components: hydrazine, methyl hydrazine, N,N'-dimethyl hydrazine, aminoacetic acid hydrazide, β-aminopropionic acid hydrazide, γ-aminobutyric acid hydrazide, ε-aminocaproic acid hydrazide, iminodiacetic acid hydrazide, iminodipropionic acid hydrazide, aminoethyl semicarbazide and aminopropyl semicarbazide. The preferred components from this series are hydrazine and aminoacetic acid hydrazide and aminoethyl semicarbazide. Owing to the different reactivity, aliphatic aromatic diamines such as meta-aminobenzylamine, 1,2,3,4-tetrahydronaphthalene-1,5 - diamine, p-aminophenyl-ethylamine and 1,2,3,4,5,6-hexahydro-diphenylmethane-4,4'-diamine also act as reactive components in the sense indicated above. Dihydrazide compounds which have hydrazide, semicarbazide or carbazic acid ester groups are also capable of bringing about the required cross-linking when their solution are caused to act on shaped polyurethane products although their lower reactivity requires longer reaction times.

Examples of dihydrazide compounds are carbodihydrazide, tartaric acid dihydrazide, terephthalic acid dihydrazide, 4-semicarbazido-benzoic acid hydrazide, hexamethylene-bis-semicarbazide, β-semicarbazido-ethylcarbazic ester and β-semicarbazido-propionic acid hydrazide. There is no limit in principle to the molecular weight of the reactive components but in practice compounds having molecular weights of below about 1000 are used and preferably those which have molecular weights of from 32 to about 500. The reactive components described above may be regarded as reactants which react with the polyurethanes which contain uretdione groups and are free from NCO groups, and according to the invention they are caused to react on the said polyurethanes either during the shaping process (e.g. during the process of coagulation and spinning) or after the shaping process, e.g. on finished foils, the said reaction involving crosslinking of the polyurethanes. In this respect, they differ from so-called chain lengthening agents, which serve for the reaction, in solution, of NCO prepolymers which have free NCO end groups (the said reaction involving linear chain lengthening).

EXPLANATORY NOTES ON THE METHODS OF MEASUREMENT AND MEASURABLE VARIABLES IN THE EXAMPLES

In order to be able to synthesize polyurethanes with as high a molecular weight as possible, it is necessary to use as accurately as possible the equivalent quantity of diisocyanates for the reaction with hydroxyl components. In order therefore to exclude slight traces of impurities in the solvent and in the diisocyanate, the diisocyanate is first dissolved in dimethyl formamide, and the NCO content of the resulting solution is determined by titration after it has been left to stand for 30 minutes. The NCO value found is then in most cases slightly below the value calculated. For the subsequent reaction, however, only the NCO content determined by titration referred to for the sake of brevity as the "aged NCO content" in the description of the methods of preparation, is taken into account. If, for example, 30.4 g. of diphenyl methane-4,4'-diisocyanate are dissolved in 138 g. of anhydrous, freshly distilled, pure dimethyl formamide, the calculated NCO content of the solution is 6.08%. In fact, however, the NCO content found after 30 minutes is only 6.04%. The dimethyl formamide solution therefore has an "aged NCO content" of 6.04%.

The reaction of di-n-butylamine with the uretdione ring at room temperature or slightly elevated temperatures yields a biuret derivative.

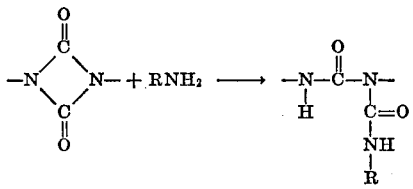

Since the opening of the ring with formation of a biuret derivative which occurs in the course of this reaction theoretically involves the consumption of an amine which is equivalent to a free NCO group, the uretdione group content within the polurethane determined in this way will be referred to in the following examples as "activable isocyanate" (although in actual fact, of course, no free NCO groups are present, as can easily be demonstrated by the absence of infra-red absorption of the NCO band).

The molecular weight of the polyurethane elastomer is defined in terms of the $(\eta)_i$ value, the so-called intrinsic viscosity.

$$(\eta)_i = \frac{\ln \eta_r}{c}$$

In the above equation, $\eta_r$ denotes the relative viscosity of the solution of the polymer in hexamethyl phosphoramide at 20° C., and $c$ denotes the concentration in g./100 ml. of solution.

In order that the progress of the reaction may be more clearly followed in the course of preparation of the products, the starting components are in addition specified in terms of their OH equivalents or NCO equivalents according to their reactive end groups. Furthermore, it should be noted that 1 mol of the uretdione ring corresponds to one equivalent of an H-active compound, e.g. one OH group or one $NH_2$ group.

Investigation of the elastic properties of the threads and foils was carried out by the methods of measurement described in Belgian patent specification 734,194, according to which measurement of the elongation at break is carried out on a tearing machine in which the length of test sample clamped into the machine is controlled by a light barrier with appropriate compensation for the slippage at the clamps.

The elastic properties are specified by measuring the modulus 300% (in the first elongation curve), the modulus 150% (in the third return curve) and the permanent elongation (after three times 300% with elongation rates of 400% per minute, 30 seconds after removal of the load).

Determination of the heat distortion temperature (HDT) of elastomer threads: The titre of elastomer threads is determined (weighing of a piece of thread which is under an initial loading of 0.045 mg./dtex.) after they have been laid out for about 3 hours without tension under standard atmospheric conditions. An elastomer thread is clamped for a length of 250 mm. under an initial loading of 1.8 mg./dtex. at room temperature and suspended in a glass tube which is filled with nitrogen. The tube is surrounded by a heating jacket through which a stream of thermostatically controlled, heated silicone oil flows. The temperature in the tube is at first raised to about 125° C. in about 30 minutes. The temperature is subsequently increased at a rate of 2.1° C. per minute until the length of the elastomer thread has changed by more than 400 mm. The measured values obtained are ploted on a graph on which one unit of length along the abscissa corresponds to a temperature difference of 10° C. and one unit of length along the ordinate corresponds to a change in length of the elastomer thread of 20 mm. The heat distortion temperature is defined as that temperature which is obtained on the graph by vertical projection of the point of contact of the 45° tangent with the temperature/elongation curve onto the abscissa.

The thermal stability of the elastomers may generally be regarded to increase with increasing HDT value. The HDT should be at least 140° C. and for high grade elastomer threads at least 145° C. but preferably higher than 150° C.

Determination of the tension drop in hot water (HWSA) of elastomer threads: A piece of thread clamped for a length of 100 mm. (initial tensioning weight 0.9 mg./dtex.) is stretched by 100% at 20° C., and the resulting thread tension (mg./dtex.) is measured after 2 minutes (first value). The thread which is kept stretched by 100% is then immersed in water at 95° C. and the tension is measured after 3 minutes immersion (second value). After this measurement, the thread is removed from the water bath and left at room temperature for 2 minutes. The prestretched thread still in the clamp is then released until it is no longer under tension, and the residual elongation is then determined immediately (third value).

Schematic representation of the values obtained in the examples (abbreviation HWSA):

| 1st value | 2nd value | 3rd value |
|---|---|---|
| Tensions | | |
| In air at 20° C. (mg./dtex.) | In water at 95° C. (mg./dtex.) | Residual elongation after removal of load in air at 20° C. (percent). |

The hydrothermal properties should be regarded as being higher, the greater the second value (tension in hot water in mg./dtex.) and the smaller the third value (the residual elongation after the treatment without a load). The tension value obtained in water should be at least 13.5 mg./dtex. and in the case of high grade elastomer threads it should be at least 18 mg./dtex. The residual elongation after the hydrothermal treatment should be less than 45% when the thread is no longer under tension, and preferably less than 40%.

Determination of the elongation in hot water (HWL) of elastomer threads: A weight of 27 mg./dtex. is suspended to a 50 mm. long piece of thread by means of a clamping device and the thread is left to hang freely in air at room temperature for 25 minutes. The percentage elongation was determined after a loading time of 25 minutes (1st value). The elongated thread is then immediately dipped in water at 95° C. together with its loading weight, and the elongation produced in water after 25 minutes is read off. The figure obtained is given as percentage elongation based on the clamped in length of thread of 50 mm. (2nd value). The loaded thread is then lifted out of the hot water bath, and the residual elongation is determined by lifting the weight until the thread is free from tension (3rd value).

Schematic representation of the values obtained in the examples (abbreviation HWL):

| 1st value | 2nd value | 3rd value |
|---|---|---|
| Elongation | | |
| In air at 20° C. (percent). | In water at 95° C. (percent). | Residual elongation after removal of load in air at 20° C. (percent). |

The smaller the second value (elongation in hot water) and the smaller the third value (permanent elongation after removal of load), the better are the hydrothermal properties considered to be.

For high grade elastomer threads, the second value should be less than 250% and preferably less than 150% and the residual elongation (3rd value) should be less than 150% and preferably less than 100%.

The following measured values are obtained for specifying the threads and foils:

|  | Dimensions | Abbreviations |
| --- | --- | --- |
| Tensile strength | g./dtex | RF |
| Elongation at break | Percent | Dhg. |
| Modulus 300 (100/100) | Mg./dtex | M 300 (200/100) |
| Modulus 150/R | Mg./dtex | M 150/R |
| Permanent elongation | Percent | bl. Dhg. |
| Decrease in tension in hot water. | (a) Mg./dtex<br>(b) Mg./dtex<br>(c) Percent permanent elongation. | HWSA |
| Elongation in hot water | (a) Percent elongation<br>(b) Percent elongation<br>(c) Percent permanent elongation. | HWL |
| Heat distortion temperature. | °C | HDT |

The parts given in the examples are parts by weight unless otherwise indicated.

The following examples are to further illustrate the invention without limiting it.

Example 1

600 parts of a copolyester of adipic acid, hexane-1,6-diol and neopentyl glycol having an average molecular weight of 1680 (0.716 equivalent of OH) are reacted with 124.7 parts of dimeric tolylene-2,4-diisocyanate (0.716 equivalent of free NCO) in 725 parts of anhydrous dimethyl formamide for 12 hours at temperatures of between 55° C. and 60° C. The dimeric diisocyanate slowly goes into solution and the viscosity of the solution increases at the same time. The 50% solution is then diluted to 26% with 1340 parts of dimethyl formamide. The viscosity of the solution in 400P, the $\eta_1$ value 1.04. The activable NCO content of the solution is 0.5% (corresponding to 1.925% of activable NCO based on the solid substance, which corresponds to a uretdione content of 0.46 equivalent per kg. of solid substance).

Spinning apparatus: The following spinning conditions were observed during the following experiments. The solution is spun into the precipitation bath (or crosslinking bath) (bath I) through a 20 aperture die having apertures of 0.12 mm. in diameter by means of dosing pumps. The precipitation liquid used was preferably water or mixtures of solvents and water, e.g. dimethyl formamide/water 10:90. The length of the coagulation bath is 250 cm. After their passage through this precipitation bath, the threads were conducted over washing rollers through a washing bath (bath II) at a rate of 5 m./min. and in some cases also through another washing bath or reaction bath (bath III) (length 350 cm.) following bath II before they were wound on spools. In bath III, the threads may either be washed again or continuously after-treated under stretched conditions, optionally at an elevated temperature. The threads may again be treated with a reactive component in bath III, and this after-treatment may include a stretching treatment. When wound on the spools, the threads may again be treated in water at an elevated temperature (one hour at 90° C.) before they are dried.

Comparison tests: When polyurethane solutions which contain uretdione groups are spun into a precipitation bath (water or 90:10 mixtures of water and dimethyl formamide) which does not contain a uretdione cross-linking agent (e.g. diamine), the threads obtained have only a low tensile strength, low moduli, low restoring forces (M/150R) and very high permanent elongations. Moreover, the hydrothermal properties are completely unsatisfactory. The heat distortion temperature is very low and the threads break in hot water under the test conditions used for elongation in hot water (HWL) and tension drop in hot water (HWSA). Moreover, they are very readily soluble in cold dimethyl formamide. See comparison test V 1/0 in Table 1/A and B.

Crosslinking by the process according to the invention: The tensile strength of the threads, their moduli and restoring forces are improved to several times higher values by spinning the solution into coagulation baths which contain polyamine (see test 1/1 to 1/19, Table 1/A and B). In addition, the hydrothermal properties are very greatly improved. In the test for tension drop in hot water, the threads show either only a relatively small decrease or even a slight increase in their tension in hot water compared with their tension in air at room temperature. In the determination for the elongation in hot water, the threads are in some cases observed to undergo contraction in hot water instead of the usual elongation in hot water observed in the case of spandex threads. The permanent elongation is very small in both methods of measurement (see Table 1/A and B 1/1 to 3). These hydrothermal values are substantially better than those obtained with ordinary commercial spandex (polyurethane elastomer) threads.

The good hydrothermal properties of the threads produced according to the invention may be attributed to the intensive and well ordered crosslinking reaction at the uretdione groups, which is manifested also in the insolubility of the threads in hot dimethyl formamide at 100° C. and in the considerably better heat distortion temperature as well as the increased melting point.

The density of crosslinking of any given uretdione polyurethane is affected by the chemical constitution, the conditions of the process, the thread titre, the length and nature of the coagulation zone, the composition of the precipitation bath (e.g. concentration of the diamine) and the temperature of the coagulation bath.

Typical modifications of the properties are obtained which vary according to the concentration of the crosslinking agent (Table 1/A/B, Example 1/4 to 7). Optimum concentrations of diamine exist which can be found by simple preliminary tests. This is also demonstrated for another diamine in Table 1/A/B, Examples 1/8 and 9.

If mixtures e.g. of 1% of ethylene diamine and pure dimethyl formamide are used in bath I, highly crosslinked threads are immediately obtained owing to the very high reaction rate (although dimethyl formamide is a solvent for the polyurethane which is to be spun), but the strength of the threads is then relatively low (tensile strength only 0.07 g./dtex). The most suitable precipitating agents and solvents for polyamine crosslinking agents are water and aqueous dimethyl formamide ($H_2O$/DMF ratio e.g. 95:5 to 50:50). Other organic solvents may be used instead of dimethyl formamide, e.g. ethanol, methanol, dimethyl acetamide, dimethyl sulphoxide, N-methyl pyrrolidone or tetramethyl urea.

If numerous other diamines are used as crosslinking agents in the precipitation baths of water and 10% dimethyl formamide, e.g. the following crosslinking agents (concentration in the bath in percent):

cyclohexane-1,4-diamine (1.0%),
p-xylylene diamine (1.0%),
N-methyl-bis-(γ-aminopropyl)-amine (1.0%),
bis-(γ-aminopropyl)-N,N'-piperazine (1.0%),
2,5-dimethyl piperazine (4.2%),
piperazine hexahydrate (0.71%),
diethylenetriamine (0.52%), or
triethylenetetramine (0.26%), crosslinked threads (insoluble in dimethyl formamide) which have improved values for strength, permanent elongation, hydrothermal properties and moduli are obtained in the same way as described in the above examples. The best values are obtained with primary diamines whereas secondary diamines and primary/secondary polyamines yield less advantageous moduli. Diamines which have additional tertiary amino groups give rise to threads which can be dyed more readily with acid dyes.

While the coagulation/crosslinking bath is kept constant, the properties of the threads are typically modified by suitable additional after-treatments, e.g.

(1) Threads stored on spools for one hour in water at 50° C., (2) Threads continuously stretched 1:2 in water at 90° C. in bath III and drawn off over heated rollers at 130° C. to 140° C. and stored on spools under this tension, (3) The same as (2), but stored without tension for 2 hours, (4) Threads continuously stretched 1:2 at 90° C. in water which contains 0.25% of m-xylylene diamine, drawn off over heated rollers at 130° C. to 140° C. and stored under tension.

(5) Similar to (4), but stored without tension for 2 hours. (Examples 1/A and B 10 to 19.)

Comparison test V 1/00: 600 parts of the copolyester from Example 1 (0.716 equivalent of OH) in 725 parts of dimethyl formamide are reacted with 62.35 parts of monomeric tolylene-2,4-diisocyanate (0.716 equivalent of NCO) at 55° C. to 60° C. for 12 hours. After dilution to a solids content of 26% with dimethyl formamide, the solution is spun into a coagulation bath of water or 1% aqueous m-xylylene diamine solution as in Example 1. The threads obtained are so soft and plastic that they cannot be wound. The coagulated substance is soluble in dimethyl formamide. The $\eta_i$ value is 0.54.

Example 2

454 parts (0.1195 equivalent of NCO) of a solution of 11 parts of tolylene-2,4-diisocyanate in 470 parts of anhydrous dimethyl formamide having an aged NCO content of 1.11%, 20.8 parts of dimeric tolylene-2,4-diisocyanate (0.1195 equivalent of NCO) and 96 parts of anhydrous dimethyl formamide are added to 200 parts of a copolyester of adipic acid, hexane-1,6-diol and neopentyl glycol having an average molecular weight of 1680 (0.239 equivalent of OH). The reaction solution is heated at 60° C. to 65° C. for 40 hours. The 30% solution has a viscosity of 228P, an $\eta_i$ value of 0.96 and an activable NCO content of 0.31%.

Comparison test: When attempts are made to spin the polyurethane solution which contains uretdione groups into a precipitation bath of water and 10% of DMF, it is not found possible to draw off continuous lengths of thread (see Table 2, V 2/0).

Process according to the invention: When the above solution is spun into precipitation baths to which 1% of aliphatic diamines have been added, highly crosslinked threads which are insoluble in dimethyl formamide are immediately obtained (see Table 2, experiment 2/1–3). The permanent elongation of these threads is zero (complete recovery!) and the threads have excellent hydrothermal properties.

TABLE 1/A

| Number | Precipitation bath | RF, g./dtex. | Elongation, percent | M 100 | M 200 | M 300 | M 150/R | Permanent elongation, percent | HDT, °C. | M.P., °C.[3] |
|---|---|---|---|---|---|---|---|---|---|---|
| | H₂O/DMF—10% | | | | | | | | | |
| V 1/0 | Comparison test without diamine [1] | 0.17 | 695 | 37 | 41 | 48 | 8 | 68 | 90 | 160–170 |
| 1/1 | +1% H₂N(CH₂)₂NH₂ [1] | 0.35 | 300 | 30 | 75 | 350 | 22 | 0 | 149 | 180–185 |
| 1/2 | +1% H₂N(CH₂)₆NH₂ [1] | 0.26 | 330 | 21 | 45 | 198 | 18 | 0 | 144 | 180–190 |
| 1/3 | +1% H₂N(CH₂)₁₂NH₂ [1] | 0.29 | 300 | 27 | 79 | 290 | 22 | 0 | 154 | 190–195 |
| 1/4 | +0.25% m-xylene | 0.26 | 317 | 72 | 108 | 245 | 19 | 2 | 146 | |
| 1/5 | +0.5% m-xylene | 0.38 | 314 | 66 | 117 | 372 | 24 | 2 | 151 | |
| 1/6 | +1.0% diamine [2] | 0.34 | 331 | 46 | 86 | 268 | 21 | 0 | 150 | |
| 1/7 | +1.5% diamine [2] | 0.36 | 332 | 42 | 80 | 260 | 21 | 0 | 150 | |
| 1/8 | +0.25% H₂N(CH₂)₂NH₂ [2] | 0.13 | 244 | 61 | (⁴) | (⁴) | (⁴) | (0–2) | 143 | |
| 1/9 | +5.0% H₂N(CH₂)₂NH₂ [2] | 0.19 | 216 | 83 | (⁴) | {⁵130 / ⁵190} | (⁴) | (0–2) | 152 | |
| | H₂O + 1% m-xylylene diamine | | | | | | | | | |
| 1/10 | Aftertreatment 1 | 0.39 | 269 | 47 | 125 | ⁵390 | (⁴) | (0–2) | 155 | |
| 1/11 | Aftertreatment 2 | 0.36 | 245 | 48 | 250 | ⁵360 | (⁴) | (0–2) | 159 | |
| 1/12 | Aftertreatment 3 | 0.38 | 253 | 39 | 164 | ⁵380 | (⁴) | (0–2) | 159 | |
| 1/13 | Aftertreatment 4 | 0.28 | 236 | 47 | 181 | ⁵280 | (⁴) | (0–2) | 145 | |
| 1/14 | Aftertreatment 5 | 0.39 | 277 | 40 | 128 | ⁵390 | (⁴) | (0–2) | 155 | |
| | H₂O + 0.25% m-xylylene diamine | | | | | | | | | |
| 1/15 | Aftertreatment 1 | 0.39 | 303 | 40 | 131 | ⁵390 | 26 | 0 | 151 | |
| 1/16 | Aftertreatment 2 | 0.25 | 223 | 50 | 228 | ⁵250 | (⁴) | (0–2) | 151 | |
| 1/17 | Aftertreatment 3 | 0.29 | 242 | 46 | 157 | ⁵290 | (⁴) | (0–2) | 148 | |
| 1/18 | Aftertreatment 4 | 0.41 | 271 | 45 | 193 | ⁵410 | (⁴) | (0–2) | 157 | |
| 1/19 | Aftertreatment 5 | 0.43 | 248 | 39 | 154 | ⁵430 | (⁴) | (0–2) | 157 | |

[1] Aftertreatment: 1 hour water 50° C.
[2] Aftertreatment: 1 hour water 90° C.
[3] The melting point was determined on threads which had been placed on the Kofler block for 2 minutes.
[4] Owing to conditions of measuring, no longer determinable.
[5] At breakage point.

NOTE.—DMF=Dimethyl formamide.

TABLE 1/B

| | HWSA | | | HWL | | | |
|---|---|---|---|---|---|---|---|
| Number | 1st value, mg./dtex. | 2nd value, mg./dtex. | Permanent elongation, percent | 1st value, percent | 2nd value, percent | Permanent elongation, percent | Solubility in dimethyl formamide |
| V 1/0 | 20.1 | [1] <1.0 | | 194 | Breakage in hot H₂O | | Soluble. |
| 1/1 | 19.9 | 22.4 | 3 | 210 | 158 | 14 | Insoluble. |
| 1/2 | 16.7 | 18.2 | 9 | 202 | 180 | 20 | Do. |
| 1/3 | 39.0 | 41.4 | 3 | 144 | 112 | 4 | Do. |
| 1/4 | 41.4 | 34.0 | 2 | 52 | 112 | 2 | Do. |
| 1/5 | 44.3 | 39.4 | 2 | 58 | 66 | 2 | Do. |
| 1/6 | 27.6 | 26.4 | 2 | 96 | 122 | 6 | Do. |
| 1/7 | 26.1 | 24.5 | 4 | 106 | 118 | 8 | Do. |
| 1/8 | 39.5 | 31.9 | 3 | 56 | 72 | 4 | Do. |
| 1/9 | 45.2 | 34.2 | 4 | 48 | 60 | 4 | Do. |
| 1/10 | 27.4 | 25.7 | 4 | 96 | 88 | 4 | Do. |
| 1/11 | 25.7 | 30.0 | 2 | 104 | 78 | 2 | Do. |
| 1/12 | 22.6 | 25.3 | 2 | 120 | 130 | 6 | Do. |
| 1/13 | 26.6 | 29.1 | 2 | 106 | 84 | 4 | Do. |
| 1/14 | 24.3 | 27.2 | 3 | 106 | 86 | 4 | Do. |
| 1/15 | 25.4 | 26.7 | 2 | 110 | 98 | 2 | Do. |
| 1/16 | 24.6 | 27.0 | 2 | 98 | 84 | 0 | Do. |
| 1/17 | 23.5 | 27.5 | 2 | 116 | 96 | 0 | Do. |
| 1/18 | 28.8 | 32.1 | 3 | 100 | 70 | 2 | Do. |
| 1/19 | 23.2 | 25.7 | 2 | 108 | 82 | 0 | Do. |

[1] Then breakage in hot H₂O.

TABLE 2

| No. | Precipitation bath, $H_2O+10\%$ DMF | RF, g./dtex. | Elongation, percent | Modulus, mg./dtex. 300 | Modulus, mg./dtex. 150/R | Permanent elongation, percent | HDT, °C. | HWSA 1st value, mg./dtex. | HWSA 2nd value, mg./dtex. | Permanent elongation, percent | Solubility in dimethyl formamide |
|---|---|---|---|---|---|---|---|---|---|---|---|
| V 2/0 | Without diamine | Solution cannot be spun | | | | | | | | | Soluble. |
| 2/1 | +1% $H_2N \cdot CH_2 \cdot CH_2 \cdot NH_2$ | 0.16 | 364 | 75 | 12 | 0-1 | 145 | 13.4 | 13.4 | 7 | Insoluble. |
| 2/2 | +1% $N_2N \cdot (CH_2)_6 \cdot NH_2$ | 0.18 | 386 | 54 | 11 | 0-1 | 145 | 11.7 | 11.8 | 7 | Do. |
| 2/3 | +1% m-xylylene diamine | 0.24 | 379 | 75 | 11 | 0-1 | 145 | 13.2 | 13.7 | 4 | Do. |

NOTE.—After treatment: 1 hour $H_2O/90°$ C.

Example 3

99.2 parts of dimeric tolylene-2,4-diisocyanate (0.57 equivalent of NCO) and 253 parts of anhydrous dimethyl formamide are added to 280 parts of a polyester of adipic acid and ethylene glycol which has an average molecular weight of 982 (0.57 equivalent of OH) at 46° C. The solution is then stirred for 8 hours at 60° C. to 62° C. while 826 parts of anhydrous dimethyl formamide are slowly added dropwise. The viscosity of the solution is 38P, the $\eta_1$ value 0.58 and the activable NCO content 0.77%. The polyurethane contains about 0.705 equivalent of uretdione groups per kg. of solid substance.

When the polyurethane solution which contains uretdione groups is spun into a precipitation bath of water and dimethyl formamide, the elastomer threads obtained have only moderate elastic properties (see comparison test Table 3/A, V 3/0).

When the elastomer solution is spun into a bath of water and dimethyl formamide which contains diamine, elastic threads with considerably improved properties are obtained, the properties of the thread varying according to the concentration of diamine (see Table 3/A, 3/1–4). The melting point of the threads increases with increasing density of crosslinking. Pure m-xylylene diamine is less suitable for use as precipitation liquid because the threads obtained in it have inferior properties (Table 3/A, 3/5). After the reactive process, the dried elastomer threads are treated with isocyanates (for example phenyl isocyanate, 4,4'-diphenylmethane-diisocyanate) in an inert solvent such as petroleum ether, ethyl acetate, or with pyrocarbonic acid esters or acid anhydrides in order to free them from excess free $NH_2$ groups after the reactive process. This aftertreatment does does not affect the good elastic properties of the threads (see Table 3/B 6 to 10).

Highly crosslinked elastomer threads are also obtained by spinning the polyurethane solution which contains uretdione groups into a precipitation bath of 90 parts of water and 10 parts of dimethyl acetamide which contains hydrazine. The optimum concentration of hydrazine in the precipitation bath is determined by varying the concentration of the precipitation bath, and this optimum concentration is relatively low. The properties of the thread deteriorate if the concentration of the bath is increased (see Table 3/C, 3/11–15).

Transparent foils which are not crosslinked are obtained from the uretdione polyurethane solution by pouring the solution out on plates and then evaporating off the solvent at 100° C. If the foils are treated in dilute methanolic solutions of m-xylylene diamine, crosslinked foils are obtained which are insoluble in dimethyl formamide and have improved elastic properties (see Table 3/D, 3/16–19).

If dihydrazides are used instead of the diamine (experiments 3/20 and 21), crosslinking again occurs but distinctly more slowly.

Crosslinked foils may also be obtained by briefly exposing the uretdione polyurethane foils to a diamine atmosphere (for example ethylene diamine vapor at 25° C. for 10 minutes) (3/22).

Crosslinked films are also obtained by painting thin coats of the polyurethane solutions (for example 0.05 to 3 mm.), optionally gelling them to some extent in a moist atmosphere, then exposing them to the action of ethylene diamine vapors at 30° C. for one minute and then evaporating off the solvent (see Table 3/23).

Example 4

150 parts of a polyester of adipic acid/ethylene glycol having an average molecular weight of 982 (0.305 equivalent of OH) are heated to 50° C. with 149 parts (0.166 equivalent of NCO) of a solution of 25 parts of diphenylmethane-4,4'-diisocyanate and 156 parts of anhydrous dimethyl formamide having an aged NCO content of 4.68% for 30 minutes. 24.2 parts of dimeric tolylene-2,4-diisocyanate (0.139 equivalent of NCO) are then added and the reaction mixture is stirred at 50° C. to 58° C. for 8 hours. After the addition of a further 428 parts of anhydrous dimethyl formamide, stirring is continued at the same temperature for 7 hours. The viscosity of the solution is 14P, the activable NCO content 0.37% and the $\eta_1$ value of the elastomer 0.71.

The elastomer solution is spun into water containing 0.25% of m-xylylene diamine in the usual manner. The resulting threads have substantially better properties (see 4/1) than threads which have not been crosslinked and are still soluble in dimethyl formamide (see Table 4, comparison test V 4/0). The properties of the crosslinked threads can be still further improved by stretching them immediately after spinning (1:2 in water at 84° C.). Even greater improvement is obtained if 0.25% of m-xylylene diamine is in addition introduced into the stretching bath. This results in an increase in the tensile strength of the thread, and the HDT is also increased. In addition, such threads have excellent hydrothermal properties (the threads are observed to undergo an increase in tension or a contraction in hot water!), see Table 4, experiment 4/3.

TABLE 3/A

| Number | Precipitation bath, $H_2O+10\%$ DMF | RF, g./dtex. | Elongation, percent | M 100, mg./dtex. | HDT, °C. | M.p. °C.[1] |
|---|---|---|---|---|---|---|
| V 3/0 | +0% m-xylylene diamine | 0.26 | 674 | 74 | 136 | From 150 |
| 3/1 | +1% m-xylylene diamine | 0.35 | 350 | 82 | 146 | 160–170 |
| 3/2 | +5% m-xylylene diamine | 0.49 | 273 | 40 | 163 | 185–190 |
| 3/3 | +10% m-xylylene diamine | 0.55 | 220 | 70 | 164 | 195–200 |
| 3/4 | +20% m-xylylene diamine | 0.49 | 239 | 55 | 164 | 190–195 |
| 3/5 | +100% m-xylylene diamine | 0.12 | 286 | 35 | 125 | 180–185 |

| Number | HWSA 1st value, mg./dtex. | HWSA 2nd value, mg./dtex. | Permanent elongation, percent | HWL 1st value, percent | HWL 2nd value, percent | Permanent elongation, percent | Solubility in dimethyl formamide |
|---|---|---|---|---|---|---|---|
| V 3/0 | 42.8 | 11.4 | 81 | 11 | Breakage | | Soluble. |
| 3/1 | 51.8 | 21.6 | 56 | 20 | 132 | 72 | Insoluble. |
| 3/2 | 22.1 | 19.5 | 13 | 145 | | | Do. |
| 3/3 | 36.8 | 34.9 | 14 | 76 | 66 | 14 | Do. |
| 3/4 | 28.3 | 25.4 | 14 | 100 | 90 | 18 | Do. |
| 3/5 | 8.9 | Breakage | | 290 | | | Do. |

[1] The melting point was determined on threads which had been placed on the Kofler block for 2 minutes.

The threads were then stretched 1:2 in H₂O/84° C. and dried at 120° C. for one hour.

TABLE 3/B

| No. | Precipitation bath, H₂O +10% DMF + 0.25% m-xylylene diamine | Aftertreatment 5 minutes with— | RF, g./dtex. | Elongation, percent | M 100, mg./dtex. | Permanent elongation, percent |
|---|---|---|---|---|---|---|
| 3/6 | The spools are continuously stretched. | | 0.47 | 188 | 140 | ⁵4 |
| 3/7 | ⎫ 1:2 in H₂O + 0.25% m-xylylene diamine at 24° C and dried in air. | PE + 0.5% ¹ | 0.43 | 171 | 170 | ⁵7 |
| 3/8 | | PE + 0.5% ² | 0.48 | 200 | 135 | ⁵11 |
| 3/9 | | Ethyl acetate + 0.5% ³ | 0.40 | 175 | 150 | ⁵13 |
| 3/10 | ⎭ | PE + 0.5% ⁴ | 0.46 | 193 | 140 | ⁵10 |

| No. | HDT, °C. | HWSA | | | HWL | | | Solubility in dimethyl formamide |
|---|---|---|---|---|---|---|---|---|
| | | 1st value, mg./dtex. | 2nd value, percent | Permanent elongation, percent | 1st value, percent | 2nd value, percent | Permanent elongation, percent | |
| 3/6 | 157 | 72.9 | 48.5 | 15 | 34 | 44 | 14 | Insoluble. |
| 3/7 | 157 | 91.5 | 59.1 | 14 | 20 | 30 | 12 | Do. |
| 3/8 | 156 | 75.3 | 47.4 | 18 | 28 | 42 | 16 | Do. |
| 3/9 | 157 | 88.4 | 57.0 | 19 | 24 | 32 | 14 | Do. |
| 3/10 | 157 | 72.0 | 46.5 | 17 | 28 | 40 | 12 | Do. |

¹ Phenyl isocyanate.
² Diphenylmethane-4,4'-diisocyanate.
³ Triisocyanate L=reaction product of hexane triol and 3 mols of tolylene-2,4-diisocyanate.
⁴ Pyrocarbonic acid ester.
⁵ After 150% stretching.

NOTE.—PE=Petroleum ether.

TABLE 3/C

| Number | Precipitation bath, H₂O+10% DMac | RF g./dtex. | Elongation, percent | Mg./dtex. | | Permanent elongation, percent |
|---|---|---|---|---|---|---|
| | | | | M 200 | M 150/R | |
| 3/11 | +0.1% hydrazine hydrate | 0.61 | 395 | 240 | 20 | 57 |
| 3/12 | +0.2% hydrazine hydrate | 0.49 | 270 | 305 | ¹ 42 | 15 |
| 3/13 | +0.4% hydrazine hydrate | 0.53 | 270 | 280 | ¹ 40 | 9 |
| 3/14 | +0.6% hydrazine hydrate | 0.14 | 225 | 113 | ¹ 12 | 14 |
| 3/15 | +0.8% hydrazine hydrate | | Threads no longer measurable | | | |

| No. | HDT, °C. | HWSA | | | HWL | | | Solubility in dimethyl formamide |
|---|---|---|---|---|---|---|---|---|
| | | 1st value, mg./dtex. | 2nd value, mg./dtex. | Permanent elongation, percent | 1st value, percent | 2nd value, percent | Permanent elongation, percent | |
| 3/11 | 138 | 76.3 | 28.3 | 48 | 12 | 30 | 20 | Insoluble. |
| 3/12 | 145 | 76.1 | 28.2 | 26 | 20 | 32 | 6 | Do. |
| 3/13 | 150 | 56.4 | 35.8 | 14 | 32 | 50 | 10 | Do. |
| 3/14 | 136 | 15.7 | 10.1 | 23 | | | | |
| 3/15 | | Threads no longer measurable | | | | | | |

¹ After stretching three times to 200%.

NOTE.—
Aftertreatment: 1 hour H²O/90° C.
DMAc=dimethyl acetamide.

TABLE 3/D

| Number | Aftertreatment of the transparent foils in CH₃OH, 64° C. | RF, g./dtex. | Elongation, percent | Mg./dtex. | | Permanent elongation, percent | Solubility in dimethyl formamide |
|---|---|---|---|---|---|---|---|
| | | | | M 300 | M 150/R | | |
| V 3/16 | Without diamine, 5 minutes | 0.26 | 674 | 92 | 2 | 125 | Soluble. |
| 3/17 | +1% m-xylylene diamine, 5 min | 0.25 | 385 | 85 | 12 | 13 | Insoluble. |
| 3/18 | +3% m-xylylene diamine, 5 min | 0.30 | 344 | 144 | 13 | 15 | Do. |
| 3/19 | +5% m-xylylene diamine, 5 min | 0.28 | 348 | 138 | 11 | 15 | Do. |
| 3/20 | +1% succinic acid dihydrazide, 15 min | 0.27 | 520 | 102 | | | Do. |
| 3/21 | +1% adipic acid dihydrazide, 15 min | 0.27 | 590 | 100 | | | Do. |
| 3/22 | Transparent film 10 min. in an atmosphere of H₂N·(CH₂)₂NH₂ | 0.15 | 350 | 120 | | | Do. |
| 3/23 | Moist film 60 seconds in atmosphere of H₂N·(CH₂)₂·NH₂ | 0.12 | 340 | 111 | | | Do. |

TABLE 4

| Number | Precipitation bath | RF, g./dtex. | M 100, mg./dtex. | Elongation, percent | HDT, °C. |
|---|---|---|---|---|---|
| V 4/0 | Without diamine | 0.23 | 24 | 739 | 70 |
| 4/1 | +0.25% m-xylylene diamine | 0.27 | 19 | 396 | 47 |
| 4/2 | +0.25% m-xylylene diamine continuously stretched 1:2 in H²O. | 0.29 | 33 | 319 | 149 |
| 4/3 | +0.25% m-xylylene diamine continuously stretched 1:2 in H₂O + 0.25% m-xylylene diamine. | 0.34 | 28 | 279 | 157 |

| | HWSA | | | HWL | | | Solubility in dimethyl formamide |
|---|---|---|---|---|---|---|---|
| | 1st value, mg./dtex. | 2nd value, mg./dtex. | Permanent elongation, percent | 1st value, percent | 2nd value, percent | Permanent elongation, percent | |
| V 4/0 | 15.8 | (¹) | (²) | 344 | (¹) | (²) | Soluble. |
| 4/0 | 15 | 12.1 | 15 | 254 | 252 | 24 | Insoluble. |
| 4/2 | 18.5 | 16.3 | 7 | 160 | 170 | 20 | Do. |
| 4/3 | 19.3 | 20.3 | 4 | 150 | 134 | 12 | Do. |

¹ Thread snaps.  ² Thread breaks.

NOTE.—Aftertreatment: 1 hour/120° C. in drying cupboard.

Example 5

154.5 parts (0.223 equivalent of NCO) of a solution of 30 parts of 4,4'-diphenylmethane diisocyanate and 138 parts of anhydrous dimethyl formamide (aged NCO content 6.04%) are added to 150 parts of a polyester of adipic acid and ethylene glycol having an average molecular weight of 982 (0.306 equivalent of OH) at 42° C. After stirring the solution for 50 minutes at 50° C. to 54° C., 14.5 parts of dimeric tolylene-2,4-diisocyanate (0.083 equivalent of NCO) are added. The solution is stirred for a total of 16 hours at 55 to 60° C. 420 parts of anhydrous dimethyl formamide are added after 8 hours. The solution has a viscosity of 27P, an $\eta_1$ value of 0.79 and an activable NCO content of 0.23%.

The polyurethane threads which have been crosslinked with diamine (V 5/1) are considerably improved in their elastic properties compared with elastomer threads which have not been crosslinked and are still soluble in dimethyl formamide (see comparison test V 5/0). The quality of the crosslinked threads can be further improved by a subsequent stretching process, this improvement manifesting itself in an increase in the tensile strength, increased HDT and improved hydrothermal properties (V 5/2). If diamine is added to a stretching bath, however, crosslinking of the elastomer is clearly reduced since the properties of the thread are generally inferior to those of unstretched threads or threads which have only been stretched in pure water. It may be assumed that in this case too much diamine has reacted with the uretdione rings in the elastomer so that the end product obtained is a crosslinked elastomer which is free from uretdione groups but still has a large number of $NH_2$ groups in side chains.

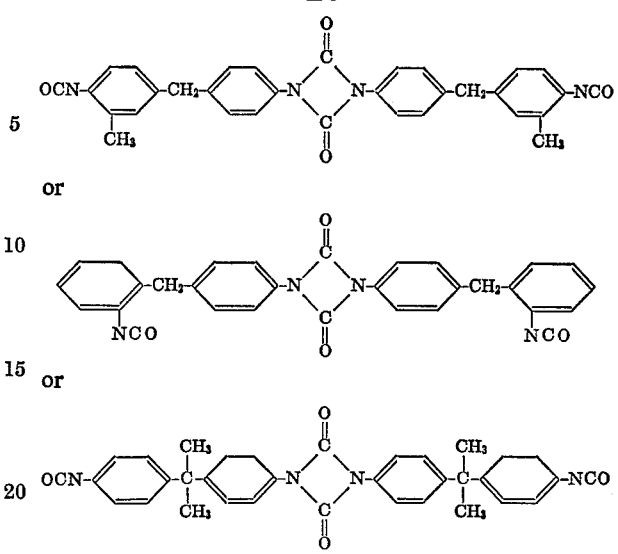

or uretdione polyurethanes are again obtained which result in improved threads and foils when treated with reactive components as crosslinking agents.

Example 7

300 parts of a copolyester of adipic acid, hexane-1,6-diol and neopentyl glycol having an average molecular weight of 1680 (0.358 equivalent OH) are reacted with 89.5 parts of diphenylmethane-4,4' - diisocyanate which contains uretdione groups (0.358 equivalent of NCO) in

TABLE 5

| Number | Precipitation bath I water | RF, g./dtex. | Elongation, percent | mg./dtex. M 300 | mg./dtex. M 150/R | Permanent elongation, percent | HDT °C. |
|---|---|---|---|---|---|---|---|
| V 5/0 | Without diamine | 0.17 | 767 | 21 | 5 | 34 | (¹) |
| 5/1 | +0.25% m-xylylene diamine | 0.35 | 448 | 54 | 14 | 4 | 155 |
| 5/2 | +0.25% m-xylylene diamine, stretched 1:2 in H₂O at 87° C. (Bath II). | 0.40 | 373 | 127 | 17 | 4 | 157 |
| 5/3 | +0.25% m-xylylene diamine, stretched 1:2 in H₂O+0.25% m-xylylene diamine at 87° C. (Bath II). | 0.32 | 385 | 106 | 12 | 10 | 154 |

| | HWSA | | | HWL | | | |
|---|---|---|---|---|---|---|---|
| Number | 1st value mg./dtex. | 2nd value mg./dtex. | Permanent elongation, percent | 1st value percent | 2nd value, percent | Permanent Permanent percent | Solubility in dimethyl formamide |
| V 5/0 | 7.7 | 0.0 | 80 | 546 | >580 | (²) | Soluble. |
| 5/1 | 12.9 | 9.7 | 23 | 286 | 330 | 52 | Insoluble. |
| 5/2 | 15.8 | 13.7 | 17 | 196 | 206 | 26 | Do. |
| 5/3 | 10.7 | 5.4 | 36 | 286 | 350 | 82 | Do. |

¹ Not measurable.  ² Not measured.
NOTE.—Aftertreatment: 120° C/1 hour.

Example 6

200 parts of a copolyester of adipic acid, butane-1,4-diol and ethylene glycol (1:1) having an average molecular weight of 2040 (0.19 equivalent of OH) are reacted with 34.1 parts of dimeric tolylene-2,4-diisocyanate (0.19 equivalent of NCO) in 665 parts of dimethyl formamide at 70° C. for 14 hours. The 26% solution has a viscosity of 7P, an $\eta_1$ value of 0.53 and an activable NCO content of the solution of 0.44%.

As may be expected, the elastomer threads which have been highly crosslinked with diamine and are insoluble in dimethyl formamide (see Table 6, 6/1) are considerably superior in their elastic properties to threads which have not been crosslinked (see comparison test Table 6, V 6/0). The values for permanent elongation fall to zero and the HDT rises from 75 to 151° C. In the hydrothermal measurement tests, the crosslinked threads are found to have excellent hydrothermal properties.

If dimeric tolylene-2,4-diisocyanate in the above reaction is replaced by equivalent quantities of:

906 parts of anhydrous dimethyl formamide for 14 hours at temperatures of between 60° C. and 80° C. (The uretdione diphenylmethane-4,4'-diisocyanate was prepared by the process disclosed in German Offenlegungsschrift No. 1,445,721.) The dimeric diisocyanate which is initially in suspension slowly goes into solution.

The viscosity of the 30% solution is 279P, the $\eta_1$ value 0.92 and the activable NCO content of the solution 0.5%.

Spinning is carried out as usual in a bath of water, dimethyl formamide and diamine, and the crosslinked threads, which are insoluble in dimethyl formamide (see Table 6, 7/1–3), again have substantially better properties than the threads which are soluble in dimethyl formamide (comparison test V 7/0). Examples 7/2 and 7/3 again show that every elastomer substance which contains uretdione groups requires an optimum range of diamine concentration in the precipitation bath for spinning in order to obtain a highly crosslinked thread. This optimum concentration can be determined in each case by simple preliminary tests.

TABLE 6

| No. | Precipitation bath, $H_2O/10\%$ DMF | RF, g./dtex. | Elongation, percent | Mg./dtex. M 300 | Mg./dtex. M 150/R | Permanent elongation, percent | HDT, °C. | HWSA 1st value, mg./dtex | HWSA 2nd value, mg./dtex | Permanent elongation, percent | Solubility in DMF |
|---|---|---|---|---|---|---|---|---|---|---|---|
| V 6/0 | Without diamine [1] | 0.11 | 1,081 | 32 | 7 | 67 | 75 | [4] | [4] | [4] | Soluble. |
| 6/1 | +1% m-xylylene diamine [1] | 0.32 | 339 | 96 | 18 | 0 | 151 | 14.2 | 16.2 | 1 | Insoluble. |
| V 7/0 | Without diamine [2] | 0.22 | 658 | 87 | 10 | 53 | 129 | [4] | [4] | [4] | Soluble. |
| 7/1 | +0.25% $H_2N \cdot (CH_2)_6 \cdot NH_2$ [2] | 0.22 | 294 | [3] 220 | 18 | 8 | 149 | 28.1 | 27.1 | 5 | Insoluble. |
| 7/2 | +0.25% m-xylylene diamine [2] | 0.26 | 346 | 128 | 15 | 16 | 141 | 21.6 | 18.9 | 11 | Do. |
| 7/3 | +1.0% m-xylylene diamine [2] | 0.27 | 318 | 245 | 16 | 6 | 148 | 22.0 | 22.6 | 8 | Do. |

[1] Aftertreatment: 1 hour $H_2O/90°$ C.   [2] Aftertreatment: 1 hour $H_2O/50°$ C.   [3] Modulus at breakage.   [4] Not measurable because the thread breaks.

Example 8

180 parts of the solution from Example 1 and 180 parts of a solution which is free from uretdione groups and which was prepared as follows:

664 parts of a solution of 85.1 parts of diphenylmethane-4,4'-diisocyanate and 1019 parts of dimethyl formamide (aged NCO content 2.59%) are added to 200 parts of a copolyester of adipic acid, hexane-1,6-diol and neopentyl glycol having an average molecular weight of 1680. When the solution has been heated to 40° C., the NCO content of the solution is 0.78%. 834 parts of this solution are introduced at temperatures of between 30° C. and 35° C. into a solution of 12.85 parts of β-semicarbazido-propionic acid hydrazide, 25.7 parts of water and 166.4 parts of dimethyl formamide. The viscosity of the polyurethane solution is 560P and the $\eta_i$ value 1.13, were mixed and diluted with 90 parts of dimethyl formamide. The viscosity of the solution is 55P, the activable NCO content of the solution 0.22%.

When the solution was spun into precipitation baths which contained 1% of diamines, the threads obtained had distinctly better properties (especially improved permanent elongation) than threads which had been spun into a precipitation bath which was free from diamines (see comparison test V 8/0). Moreover, the crosslinked threads according to the invention have all become insoluble in dimethyl formamide (see Table 7/A, 8/1 to 8/3).

Crosslinked foils are obtained by causing ethylene diamine vapours to act on the moist films which contain solvent in a manner analogous to Example 3 (see Table 7/B, experiments 8/4 and 8/6). Nonporous foils which are soluble in dimethyl formamide (obtained as nonporous, transparent foils by drying the solution in a drying cupboard at 100° C.) are also crosslinked by after-treating them in methanol which contains 1% of m-xylylene diamine at 60° C. for 5 minutes (experiment 8/5).

A coated product whose coating is readily soluble in dimethyl formamide is obtained by applying the uretdione polyurethane solution to a fleece produced from polycaprolactam threads and then evaporating the solvent at elevated temperature. The action of a diamine in solution (for example 1% of ethylene diamine in 50% aqueous dioxane) or of ethylene diamine vapour at 45° C. on the coated fleece (before or after evaporation of the solvent), however, renders the coating material insoluble in dimethyl formamide. In the case of these materials, however, the elastic properties are to a large extent determined by the fleece, thus:

(a) without aftertreatment: RF=112.7 kg./cm.$^2$, elongation=58%
(b) with aftertreatment: RF=122.5 kg./cm.$^2$, elongation=63%.

When the mixture of polyurethane solution is applied on a support as a layer of about 1 mm. in thickness and left to stand for one hour in 80% atmospheric moisture at 65° C. and then coagulated in a mixture of water and alcohol (95:5) containing 0.5% of 1,2-propylene diamine at 20° C., the product obtained is a microporous foil which has a smooth, homogeneous surface and homogeneous distribution of micropores, and there is no loss of microporosity even after drying (2 hours at 80° C.). The crosslinked foil has become resistant to solvents.

When the experiment is repeated with 1% solutions of propylene-1,3-diamine, tetramethylene-1,4-diamine, dodecamethylene-1,12-diamine, cyclohexane-1,4-diamine, p-xylylene diamine or N,N'-dimethyl ethylene diamine, crosslinked microporous foils with improved properties are again obtained.

If coagulation is again carried out in a similar manner but without the addition of diamines, soluble foils which have a less satisfactory surface (wrinkled structure) are obtained.

TABLE 7/A

| Number | Precipitation bath, $H_2O + 10\%$ DMF | RF, g./dtex. | Elongation, percent | Mg./dtex. M 300 | Mg./dtex. M 150/R | Permanent elongation, percent |
|---|---|---|---|---|---|---|
| V 8/0 | Without diamine | 0.39 | 528 | 139 | 16 | 23 |
| 8/1 | +1% $H_2N \cdot (CH_2)_2 \cdot NH_2$ | 0.39 | 387 | 187 | 19 | 11 |
| 8/2 | +1% $H_2N \cdot (CH_2)_6 \cdot NH_2$ | 0.40 | 402 | 211 | 21 | 13 |
| 8/3 | +1% m-xylylene diamine | 0.37 | 346 | 282 | 18 | 12 |

| Number | HDT, °C. | HWSA 1st value, mg./dtex. | HWSA 2nd value, mg./dtex. | Permanent elongation, percent | HWL 1st value, percent | HWL 2nd value, percent | Permanent elongation, percent | Solubility in DMF |
|---|---|---|---|---|---|---|---|---|
| V 8/0 | 150 | 32.4 | 13.7 | 40 | 76 | 430 | 152 | Soluble. |
| 8/1 | 156 | 27.9 | 19.3 | 18 | 98 | 142 | 42 | Insoluble. |
| 8/2 | 166 | 37.2 | 22.4 | 22 | 66 | 144 | 42 | Do. |
| 8/3 | 159 | 30.6 | 18.7 | 20 | 80 | 170 | 38 | Do. |

Note.—After treatment: 1 hour water/90° C.

TABLE 7/B

| Number | | RF, g./dtex. | Elongation, percent | Mg./dtex. M 300 | Mg./dtex. M 150/R | Permanent elongation, percent | Solubility in DMF |
|---|---|---|---|---|---|---|---|
| V 8/4 | Transparent foil | 0.30 | 615 | 80 | 13 | 34 | Soluble. |
| 8/5 | Transparent foil, 5 min./60° C. in methanol containing 1% of m-xylylene diamine. | 0.28 | 538 | 76 | 14 | 19 | Insoluble. |
| 8/6 | Moist film (1 mm.) treated with $H_2N \cdot (CH_2)_2 \cdot NH_2$ vapour for 1 minute. | 0.32 | 510 | 98 | 16 | 21 | Do. |

Example 9

100 parts of a copolyester of adipic acid, hexane-1, 6-diol and neopentylglycol having an average molecular weight of 1700 (0.117 equivalent OH) are reacted with 20.5 parts of dimeric tolyene-2, 4-diisocyanate (0.117 equivalent of NCO) in 150 parts of anhydrous dimethyl formamide at 60° C. to 65° C. for 30 minutes. 165.5 parts (0.059 equivalent of NCO) of a solution of 10 parts of 4, 4'-diphenylmethane diisocyanate in 204 parts of absolute dimethyl formamide having an aged NCO content of 1.49% are then added. 5.8 parts of 4, 4'-diamino-diphenylmethane (0.059 equivalent of $NH_2$) in 71.5 parts of dimethyl formamide are then immediately added to the reaction solution. After 12 hours at 60° C. to 65° C, the elastomer has an $\eta_1$ value of 0.53. The activable NCO content of the solution is 0.46%.

Spinning the solution of polyurethane urea which contains 0.44 equivalent of uretdione per kg of solid elastomer into a precipitation bath of water and dimethyl formamide again produces a thread which is soluble in dimetryl formamide and which has only moderate elastic properties (see Table 8, comparison test V 9/0). If, on the other hand, the solution is introduced into a precipitation bath which contains diamine, the properties of the resulting thread are found to be greatly improved compared with those of the thread which has not been cross-linked (9/1). This improvement is manifested in the improved tensile strength, increased modulus 300, reduced permanent elongation and good hydrothermal properties.

into an aqueous dimethyl formamide bath containing diamines as crosslinking agents as described in Example 1. The properties of the threads are considerably improved (10/1-3) compared with those obtained by spinning into a precipitation bath which is free from diamines (see comparison test Table 8, V 10/0).

TABLE 8

| Number | Precipitation bath, $H_2O$ + 10% DMF | RF, g./dtex. | Elongation, percent | Mg./dtex. M 300 | Mg./dtex. M 150/R | Permanent elongation, percent | HDT, °C. | M.P., °C. | HWSA 1st value, mg./dtex. | HWSA 2nd value, mg./dtex. | Permanent elongation, percent | Solubility in DMF |
|---|---|---|---|---|---|---|---|---|---|---|---|---|
| V 9/0 | Without diamine | 0.08 | 448 | 65 | 2 | 81 | 134 | From 225 | (¹) | (¹) | (¹) | Soluble. |
| 9/1 | +1% m-xylylene diamine | 0.22 | 341 | 175 | 11 | 39 | 150 | >240 | 26.9 | 14.6 | 41 | Insoluble. |
| V 10/0 | Without diamine | 0.25 | 757 | 33 | 5 | 27 | 131 | | 10.7 | 3.4 | 71 | Soluble. |
| 10/1 | +1% $H_2N \cdot (CH_2)_2 \cdot NH_2$ | 0.34 | 488 | 67 | 10 | 14 | 144 | | 13.5 | 6.8 | 40 | Insoluble. |
| 10/2 | +1% $H_2N \cdot (CH_2)_6 \cdot NH_2$ | 0.28 | 494 | 59 | 10 | 15 | 142 | | 13.7 | 8.3 | 40 | Do. |
| 10/3 | +1% m-xylylene diamine | 0.39 | 492 | 74 | 12 | 12 | 147 | | 16.2 | 10.1 | 32 | Do. |

¹ Breaks under test conditions.

NOTE.—After treatment: in water 1 hour/90° C.

Example 10

200 parts of a copolyester of adipic acid, hexanel-1, 6-diol and neopentyl glycol having an average molecular weight of 1680 (0.239 equivalent of OH) are reacted with 489 parts of a solution of 28 parts of tolylene-2, 4-diisocyanate in 498 parts of anhydrous dimethyl formamide having an aged NCO content of 2.57% (0.298 equivalent of NCO) at room temperature. After 5 minutes, a solution of 6.93 parts of hexamethylene diamine (0.119 equivalent of $NH_2$) in 30 parts of absolute dimethyl formamide was added dropwise in the course of 5 minutes. After a further 30 minutes, 10.4 parts of dimeric tolyene-2, 4-diisocyanate (0.060 equivalent of NCO) suspended in 88 parts of dimethyl formamide were added and the reaction mixture was heated at 60° C. to 65° C. for 20 hours. A milky, turbid solution is obtained and this is then heated at 60° C for 10 hours after the addition of 171 parts of dimethyl formamide.

The viscosity of the solution is 163P, the $\eta_1$ value 0.92 and the activable NCO content of the solution 0.11%.

The solution of the uretdione polyurethane urea is spun

Example 11

558 parts (0.358 eqivalent of NCO) of a solution of 33 parts of tolylene-2, 4-diisocyanate in 554 parts of anhydrous dimethyl formamide having an aged NCO content of 2.71% are added to 200 parts of a copolyester of adipic acid, hexane-1, 6-diol and neopentylglycol having an average molecular weight of 1680 (0.239 equivalent of OH). 10.4 parts of hexamethylene-1, 6-diamine (0.179 equivalent of $NH_2$) dissolved in 88 parts of anhydrous dimethyl formamide are then added dropwise at room temperature in the course of 5 minutes. 10.4 parts of dimeric tolylene-2, 4-diisocyanate (0.06 equivalent of NCO) are then added after a further 30 minutes. The solution is then kept at 70° C. to 80° C. for 25 hours. After dilution to 26% with 165 parts of dimethyl formamide, the turbid solution has a viscosity of 485P, an $\eta_1$ value of 1.13 and an activable NCO content of 0.10%.

The solution of uretdione polyurethane urea is spun into a precipitation bath which contains diamines in a manner analogous to Example 1. The properties of the thread are considerably improved (1-3) compared with those obtained by spinning into a coagulation bath which is free from diamines (Table 9, comparison test V 11/0).

TABLE 9

| Number | Precipitation bath $H_2O$ + 10% DMF | RF, g./dtex. | Elongation, percent | Modulus, mg./dtex. 300 | Modulus, mg./dtex. 150/R | Permanent elongation, percent | HDT, °C. | HWSA 1st value, mg./dtex. | HWSA 2nd value, mg./dtex. | Permanent elongation, percent | Solubility in DMF |
|---|---|---|---|---|---|---|---|---|---|---|---|
| V 11/0 | Without diamine | 0.32 | 507 | 58 | 9 | 22 | 125 | 9.7 | 0.2 | 75 | Soluble. |
| 11/1 | +1% $H_2N.(CH_2)_2.NH_2$ | 0.54 | 508 | 75 | 11 | 19 | 145 | 13.5 | 5.3 | 57 | Insoluble. |
| 11/2 | +1% $H_2N.(CH_2)_6.NH_2$ | 0.53 | 502 | 58 | 10 | 17 | 134 | 15.2 | 5.7 | 59 | Do. |
| 11/3 | +1% m-xylylene diamine | 0.49 | 478 | 85 | 12 | 16 | 137 | 15.0 | 6.7 | 54 | Do. |

NOTE.—Aftertreatment: 1 hour $H_2O$/90° C.

Example 12a 625 parts (0.597 equivalent of NCO) of a solution of 80 parts of 4,4'-diphenylmethane diisocyanate in 580 parts of anhydrous dimethyl formamide (aged NCO content 4.03%) are added to a solution of 200 parts of a copolyester of adipic acid, hexane-1,6-diol and neopentylglycol having an average molecular weight of 1680 (0.239 equivalent of OH), 17.9 parts of 1-aminopropanol-3 (0.239 equivalent of $NH_2$ and 0.239 equivalent of OH) and 150 parts of anhydrous dimethyl formamide at temperatures of between 25° C. and 40° C. The resulting precipitate redissolves on heating to 50° C. 20.8 parts of dimeric tolylene-2,4-diisocyanate (0.12 equipvalent of NCO) in 200 parts of anhydrous dimethyl formamide are then added to the reaction mixture. After 9 hours at 60° C. to 70° C., the solution has a viscosity of 386P, an $\eta_1$ value of 1.17 and an activable NCO content in the solution of 0.2%.

Example 12b

The reaction mixture from Example 12a was halved. 2 parts of water were stirred into one half. After 24 hours, this half of the solution has a viscosity of 370P. The $\eta_1$ value is 1.13 and the activable NCO content of the solution is 0.19%.

By spinning the polyurethane solution which contains uretdione groups into a precipitation bath which contains diamine, the threads are rendered completely insoluble in DMF, as has been described in the above experiments tomer threads which are soluble in DMF and which have moderate elastic properties are obtained (see Table 11, comparison test V 13/0 and V 13/2). If, on the other hand, the two solutions are spun into a precipitation bath which contains diamine, threads which are insoluble in DMF and which have improved hydrothermal properties are obtained in both cases (13/1+3).

TABLE 11

| | | | | | | HWL | | |
|---|---|---|---|---|---|---|---|---|
| Number | Precipitation bath, H₂O+10% DMF | RF, g./dtex. | Elongation, percent | M 300, mg./dtex. | M.P., ° C. | 1st value, percent | 2nd value, percent | Solubility in DMF |
| V 13/0 | Without diamine | 0.45 | 430 | 258 | 190–200 | 42 | 294 | Soluble. |
| 13/1 | +1% m-xylylene diamine | 0.45 | 323 | 410 | 205–210 | 34 | 220 | Insoluble. |
| V 13/2 | Without diamine | 0.46 | 428 | 268 | | 38 | 286 | Soluble. |
| 13/3 | +1% m-xylylene diamine | 0.62 | 348 | 472 | | 18 | 158 | Insoluble. |

NOTE.—After treatment: 1 hour H₂O/90° C.

(see Tables 10, 12, 1 and 3). Threads obtained by spinning into a precipitation bath of water and DMF, on the other hand, are still readily soluble in DMF (see comparison tests V 12/0 and V 12/2).

TABLE 10

| Number | Precipitation bath, H₂O+10% DMF | RF, g./dtex. | Elongation, percent | M 300 mg./dtex. | Solubility in DMF |
|---|---|---|---|---|---|
| V 12/0 | Without diamine | 0.76 | 465 | 266 | Soluble. |
| 12/1 | +1% m-xylylene diamine. | 0.83 | 338 | 650 | Insoluble. |
| 12/2 | H₂O+10% DMF | 0.68 | 444 | 348 | Soluble. |
| 12/3 | +1% m-xylylene diamine. | 0.72 | 357 | 514 | Insoluble. |

NOTE.—Aftertreatment of the threads of spools: 1 hour H₂O/90° C.

Example 13a 624 parts (0.597 equivalent of NCO) of a solution of 80 parts of 4,4'-diphenylmethane diisocyanate in 580 parts of anhydrous dimethyl formamide (aged NCO content 4.03%) are added to a solution of 200 parts of a copolyester of adipic acid, hexane-1,6-diol and neopentyl glycol having an average molecular weight of 1680 (0.239 equivalents of OH), 14.57 parts of aminoethanol (0.239 equivalent of NH₂ and 0.239 equivalent of OH) and 150 parts of anhydrous dimethyl formamide at a temperature of between 25° C. and 40° C. Any precipitate formed redissolves on heating to 50° C. After about 30 minutes, 20.8 parts of dimeric tolylene-2,4-diisocyanate (0.12 equivalent of NCO) suspended in 192 parts of anhydrous dimethyl formamide are added to the reaction solution. After the solution has been heated at 60° C. to 70° C. for 21 hours, it has a viscosity of 23P, an $\eta_1$ value of 0.81 and an activable NCO content of 0.19%.

Example 13b

The reaction mixture from Example 13a was halved. 2 parts of water were stirred into one half. After 24 hours, the viscosity of the solution is 23P, the $\eta_1$ value 0.76 and the activable NCO content 0.19%.

By spinning the two polyurethane urea solutions, one of which contains an additional amount of water, elas- Example 14

100 parts of a tetramethylene ether diol having an average molecular weight of 1510 (0.132 equivalent of OH) are reacted with 23 parts of dimeric tolylene-2,4-diisocyanate (0.132 equivalent of NCO) in 350 parts of anhyrous dimethyl acetamide for 5½ hours at a temperature of between 50° C. and 60° C. The viscosity of the 26% solution is 25P, the activable NCO content 0.56% and the $\eta_1$ value 0.58.

The solution is spun into a diamine bath as usual. The threads which have been crosslinked with p-xylylene diamine and are insoluble in DMF have considerably better elastic properties than the polyurethane threads which have not been crosslinked (Table 12, V 14/0 and 14/1).

Example 15

50 parts of a polyester of adipic acid and ethylene glycol having an average molecular weight of 982 (0.1 equivalent of OH) are reacted with 25.5 parts of dimeric diphenylmethane - 2,4' - diisocyanate (0.1 equivalent of NCO) in 211 parts of anhydrous dimethyl sulphoxide at 50° C. to 75° C. for 6 hours. The solution then has a viscosity of 12.5P, an activable NCO content of 0.73% and an $\eta_1$ value of 0.62.

When the polyurethane solution is spun into a precipitation bath which is free from diamines, threads which have only moderate elastic properties are obtained (Table 12, V 15/0). If, however, p-xylylene diamine, for example, is present in the precipitation bath at the same time, the threads obtained are insoluble in DMF and have excellent hydrothermal properties. Furthermore, the threads have a higher tensile strength and improved heat distortion temperature and lower permanent elongation (15/1).

TABLE 12

| Number | Precipitation bath, H₂O+10% DMF | RF, g./dtex. | Elongation, percent | Mg./dtex. M 300 | Mg./dtex. M 150/R | Permanent elongation, percent | HDT, ° C. |
|---|---|---|---|---|---|---|---|
| V 14/0 | Without diamine | 0.11 | 673 | 69 | 7 | 105 | 130 |
| 14/1 | +0.5% p-xylylene diamine | 0.16 | 251 | ¹ 160 | ² 36 | 29 | 143 |
| V 15/0 | Without diamine | 0.19 | 637 | 79 | 8 | 62 | 112 |
| 15/1 | +0.25% p-xylylene diamine | 0.34 | 254 | ¹ 340 | ² 18 | 5 | 154 |

| | HWSA | | | HWL | | | |
|---|---|---|---|---|---|---|---|
| Number | 1st Value, mg./dtex. | 2nd Value, mg./dtex. | Permanent elongation, percent | 1st Value, percent | 2nd Value, percent | Permanent elongation, percent | Solubility in DMF |
| V 14/0 | Breaks under test conditions | | | Breaks under test conditions | | | Soluble. |
| 14/1 | 34.9 | 13.6 | 52 | 22 | 140 | 92 | Insoluble. |
| V 15/0 | Breaks under test conditions | | | Breaks under test conditions | | | Soluble. |
| 15/1 | 14.8 | 15.4 | 8 | 152 | 152 | 12 | Insoluble. |

¹ At breakage.  ² After three times elongation to 200%.
NOTE.—After treatment: Water 1 hour/90° C.

Example 16

100 parts of a polyester of adipic acid and butane-1,4-diol having an average molecular weight of 1690 (0.12 equivalent of OH) are reacted with 12.55 parts of dimeric tolylene-2,4-diisocyanate (0.07 equivalent of NCO) and 200 parts of anhydrous N-methyl pyrrolidone at 50° C. to 57° C. in the course of one hour. 214 parts (0.29 equivalent of NCO) of a solution of 40 parts of diphenylmethane-4,4'-diisocyanate and 199 parts of N-methyl pyrrolidone having an aged NCO content of 5.64% are then added. 10.65 parts of butane-1,4-diol (0.24 equivalent of OH) in 72.5 parts of dimethyl formamide are then added in the course of 30 minutes. After a further 10 hours at 50° C. to 60° C., the 26% solution has a viscosity of 18 P, an activable NCO content of 0.23% and an $\eta_1$ value of 0.69%.

When the polyurethane solution is spun into a precipitation bath which contains diamines, threads which are insoluble in DMF and which have excellent hydrothermal properties are obtained (16%1). The elastomer threads which have not been crosslinked and which are soluble in DMF, on the other hand, are inferior in their properties (V 16/0).

dried for one hour at 100° C., the films obtained are all insoluble in dimethyl formamide as a result of crosslinking.

The aminoalkyl semicarbazides were prepared by the process described in German Offenlegunsschrift 1,902,931 and freed from their salts (hydrochloride or sulphate) by the addition of an equivalent quantity of 0.5 N sodium hydroxide solution, the solutions having a pH of about 8 to 9.

When 1% solutions of m-benzylaminoaniline are used as reactive components and the procedure described above is carried out, highly crosslinked films which are insoluble in hot dimethyl formamide are again obtained.

TABLE 13

| Number | | RF, g./dtex. | Elongation, percent | Mg./dtex. | | Permanent elongation, percent | Solubility in DMF |
|---|---|---|---|---|---|---|---|
| | | | | M 300 | M 150/R | | |
| 17/1 | Transparent foil, DMF evaporated off under vacuum at about 100° C. | 0.68 | 515 | 294 | 11 | 70 | Soluble. |
| 17/2 | Microporous foil, coagulation in H₂O for 2 hours and drying at 100° C. | 0.15 | 293 | ¹ 150 | ² 17 | 38 | Do. |
| 17/3 | Foil from 17/2 treated in CH₃OH+0.5% m-xylene diamine for 5 minutes at 64° C. and dried at 100° C. | 0.17 | 223 | ¹ 170 | ² 17 | 38 | Insoluble. |

¹ At breakage.   ² After three times elongation to 200%.

EXAMPLE 18

111.5 g. of diphenylmethane - 4,4' - diisocyanate are added to 600 parts of a copolyester of adipic acid, ethylene glycol and butane-1,4-diol (ratio of ethylene glycol to diol 1:1) having a molecular weight of 2045 at 40° C.,

| Number | Precipitation bath, H₂O+10% DMF | Solubility in DMF | HWL | | Permanent elongation, percent |
|---|---|---|---|---|---|
| | | | 1st value, percent | 2nd value, percent | |
| V 16/0 | Without diamine | Soluble | Breaks under test conditions | | |
| 16/1 | 0.5% m-xylylene diamine | Insoluble | 30 | 40 | 8 |

Example 17

A solution of 15.85 parts of 1,3-aminopropanol (0.21 equivalent of NH₂+0.21 equivalent of OH) and 200 parts of anhydrous dimethyl formamide are added to 200 parts of a polyester of adipic acid and butane-1,4-diol having an average molecular weight of 948 (0.42 equivalent of OH) at room temperature. 283 parts (0.42 equivalents of NCO) of a solution of 60 parts of diphenylmethane-4,4'-diisocyanate in 260 parts of dimethyl formamide having an aged NCO content of 6.27% are then added at a temperature of between 30° C. and 36° C. After the solution has been heated at 50° C. for 30 minutes, 73.5 parts of dimeric tolylene-2,4-diisocyanate (0.42 equivalent of NCO) in 544 parts of dimethyl formamide are added. The solution is then heated at 53° C. to 55° C. for 6 hours. It then has a viscosity of 19P, an activable NCO content of 0.67% and an $\eta_1$ value of 0.7.

Transparent films which are soluble in DMF and practically impermeable to water vapor are obtained by applying the polyurethane solution to plates and then evaporating the solvent at 100° C. under a slight vacuum (Table 13, 17/1). If the freshly cast film is coagulated in water, however, a microporous film is obtained which is also soluble in DMF (17/2). The microporous film is rendered insoluble in DMF by after-treating it with methanol which contains 0.5% of m-xylylene diamine (17/3). The films may also be crosslinked within a short time by means of other diamines, e.g. ethylene diamine, dodecamethylene-1,12-diamine, 1,4-diaminocyclohexane, 3-aminomethyl aniline or 4-(β-aminoethyl)-aniline.

If the elastomer solution is painted on glass plates in a layer of about 1.2 mm. in thickness and then introduced into 1% solutions of aminohydrazides or aminosemicarbazides in a solvent mixture (of 90% water and 10% dimethyl formamide) and the films are then removed after 0.5, 1 or 5 minutes and then vigorously rinsed in fresh water for thorough removal of the solvent and then and this reaction mixture is then immediately reacted with a suspension of 38.5 parts of dimeric tolylene-2,4-diisocyanate in 322 parts of dimethyl formamide which is at a temperature of 70° C. (ratio of diisocyanates 80:20) and the reaction mixture is kept at a temperature of 50° C. for 35 minutes. The resulting NCO prepolymer solution which contains uretdione groups contains 1.635% of free NCO groups and 0.44% of activable NCO obtained from uretdione groups.

400 parts of the NCO prepolymer solution are introduced into a reaction vessel and a solution of 7 g. of carbodihydrazide in 743 g. of dimethyl formamide (equivalent quantity based on free NCO groups) which is heated to 70° C. is added to the prepolymer solution within a few seconds. A homogeneous, clear elastomer solution which has a solution viscosity of 160 poise is obtained. The solution is stable for several weeks. The polyurethane contains 60.14 equivalents of uretdione groups per kg. of solid substance. When the solution is spun into a precipitation bath of 90% water and 10% DMF through multiaperture dies, threads which are soluble in DMF are obtained (comparison experiment).

If, on the other hand, the solution is spun in a similar manner into a precipitation bath of 90% water and 10% DMF to which 1% of ethylene diamine has been added, the threads obtained are insoluble in DMF and have a slightly reduced elongation at break and increased tension on elongation. The surface of the crosslinked film has become non-tacky.

When the solution is cast to form films, clear, highly viscous films are obtained which remain readily soluble in DMF for periods of over half a year. When strips of film (about 0.20 mm. in thickness) are treated in 1% ethylene diamine baths at room temperature, they are observed to become rapidly insoluble, the insolubility starting from the surface and increasing with the length of time for which they are exposed to the treatment.

| | | |
|---|---|---|
| 1% of ethylene diamine in water/20° C. | 1 min. | Surface skin insoluble at 120° C., soluble in DMF. |
| Do | 3 min. | Almost completely cross-linked, soluble in DMF at 140° C. |
| Do | 10 min. | Film insoluble, soluble in DMF at 140° C. |
| Do | 30 min. | Film insoluble, dissolves in DMF only at 140 to 150° C. |
| 1% of ethylene diamine in methanol/20° C. | 30 min. | Film insoluble, dissolves in DMF only at 140° C. |
| 1% of carbodihydrazide in aqueous methanol/50° C. | 30 min. | Do. |

If the elastomer solution which contains uretdione groups is painted on a glass plate to form a layer of about 0.9 mm. in thickness which is then exposed to steam for 30 minutes to gel the solution and then placed into an aqueous coagulation bath which contains 0.25 per mil of ethylene diamine for 30 minutes and dried, a microporous film which has a permeability to water vapor (according to IUP 15) of 4.5 mg./h./cm.², a smooth surface and a very high resistance to solvents even under pressure or tension is obtained. The film is resistant to dimethyl formamide at temperatures of up to 100° C. and only starts to dissolve at 140° C. The films obtained in coagulation baths which are free from diamines have an unsatisfactory surface and are soluble in DMF. If the NCO prepolymer solution (400 parts) is reacted as above, but at room temperature, with a solution of 7 g. of carbodihydrazide in 14 g. of water and 743 g. of DMF, a homogeneous, slightly less viscous (100P), stable elastomer solution is again obtained.

If the elastomer solution (400 parts) is poured into a solution of excess carbodihydrazide (10% excess) which is at a temperature of 70° C., a solution which is not quite homogeneous and which constantly increases in viscosity (until it finally gels) is obtained. Under these conditions, the hydrazide group may continue to react to result in opening and branching of the uretdione ring.

EXAMPLE 19

A uretdione polyurethane which is stable in storage is prepared according to Example 1 of German Auslegeschrift 1,153,900 and then dissolved in dimethyl formamide to form a 20% solution. The solution is spun in the usual manner into an aqueous precipitation bath which contains 0.8% of hexamethylene diamine. Highly crosslinked threads which are insoluble in dimethyl formamide are obtained.

What we claim is:

1. A process for the production of crosslinked shaped polyurethane products, which comprises reacting at a temperature of from 0 to 80° C. a crosslinking reactive component with a high molecular weight uretdione group-containing polyurethane which is free from NCO groups, in the liquid or gaseous state, said crosslinking reactive component being selected from the group consisting of
   (a) a polyamine which contains primary or secondary amino groups attached to aliphatic carbon atoms,
   (b) a polyfunctional compound which has at least one primary or secondary amino group attached to an aliphatic carbon atom and at least one other group containing a reactive hydrogen atom attached to nitrogen, selected from the group consisting of a hydrazide group, a semicarbazide group, a carbazic acid ester group and an aromatically linked amino group,
   (c) a dihydrazide compound selected from the group consisting of a di-hydrazide, a bis-semicarbazide, a bis-carbazic acid ester, a hydrazide-semicarbazide, a hydrazide-carbazide acid ester and a semicarbazide-carbazic acid ester,
   (d) hydrazine, and
   (e) mixtures thereof, said reacting being effected during or after the shaping process, wherein said uretdione group-containing polyurethane contains at least 0.05 equivalents of uretdione groups per kg. of solid polyurethane substance and has an inherent viscosity $\eta_i = ln\eta r/c$ of at least 0.35.

2. The process of claim 1 wherein said uretdione groups containing polyurethane is shaped from its solution in a polar organic solvent.

3. The process of claim 1 wherein a solution of said high molecular weight polyurethane which is free from NCO and which has a uretdione content of at least 0.05 equivalent per kg. of polyurethane is spun into a bath of said cross-linking reacting component so as to produce a highly elastic, crosslinked polyurethane filament or foil.

4. The process of claim 3, said bath consisting of said reactive component in the liquid state.

5. The process of claim 3, said bath being a solution of said reactive component in the liquid state.

6. The process of claim 2 wherein foils are produced by painting said solution in a thin layer on a support and then coagulating said layer in a bath of a non-solvent for said polyurethane, said reacting being effected during or after said coagulating.

7. The process of claim 6, said reacting being effected after a preliminary treatment of the coagulated layer to produce a microporous foil.

8. The process of claim 6 wherein said solution is painted in a thin layer of less than 3 mm. in thickness and is coagulated and at the same time crosslinked in said bath, said bath consisting of a solution of said reactive component.

9. The process of claim 6 werein said solution is first coagulated in said bath consisting of a non-solvent and thereafter after-treated and crosslinked in a bath consisting of a solution of said reactive component.

10. The process of claim 9, said process being carried out continuously.

11. The process of claim 1 wherein said temperature is room temperature.

12. The process of claim 1 wherein said reactive component is reacted in the form of a 0.001 to 50% solution in a solvent selected from the group consisting of an organic solvent, an aqueous solvent mixture and water.

13. The process of claim 12 wherein said reactive component is reacted in the form of a 0.01 to 10% solution.

14. The process of claim 1 wherein said shaped product is a product selected from the group consisting of a filament, a foil and a coating, having been produced by removal of the solvent from a solution of a high molecular weight uretdione group containing polyurethane which is free from NCO, which is then subjected to the action of said reactive component.

15. The process of claim 14 wherein said reactive component is in the liquid state.

16. The process of claim 14 wherein said reactive component is dissolved.

17. The process of claim 14 wherein said reactive component is in the gaseous state.

18. The process of claim 1 wherein said reactive component is a polyamine which has primary or secondary amino groups attached to aliphatic carbon atoms and a molecular weight of below 1000.

19. The process of claim 18 wherein said molecular weight is below 500.

20. The process of claim 18 wherein said polyamine is selected from the group consisting of a diprimary aliphatic $C_2$ to $C_{12}$ alkylene diamine, a cycloaliphatic diamine of the cyclohexane or dicyclohexylmethane series and a diamine of the xylylene series.

21. The process of claim 20 wherein said polyamine consists to a major proportion of a diamine selected from the group consisting of ethylene diamine, m-xylylene diamine, p-xylylene diamine and mixtures thereof.

22. The process of claim 1 wherein said reactive component is a polyfunctional compound which has at least one primary or secondary amino group attached to an aliphatic carbon atom and at least one additional reactive group which has active hydrogen attached to nitrogen, said additional reactive group being selected from the group consisting of a hydrazide group, a semicarbazide group, a carbazic acid ester group and an aromatically bound amino group, the molecular weight of said reactive component being below 1000.

23. The process of claim 1 wherein said reactive component is hydrazine.

24. The process of claim 1 wherein said polyfunctional reactive component has a functionality of not more than 3.

25. A cross-linked filament produced by the process of claim 1.

26. Crosslinked shaped polyurethane products produced by the process of claim 1.

References Cited

UNITED STATES PATENTS

| 3,553,173 | 1/1971 | Wieden et al. | 260—77.5 |
| 3,640,937 | 2/1972 | Thoma et al. | 260—30.8 |
| 3,642,669 | 2/1972 | Nast et al. | 260—2.5 |
| 3,658,746 | 4/1972 | Rosendahl et al. | 260—30.8 |

OTHER REFERENCES

Hofmann; Berichte 8, 246 (1871).
Raiford et al.: Jour. Org. Chem. 8, 230 1943.

DONALD E. CZAJA, Primary Examiner

H. S. COCKERAM, Assistant Examiner

U.S. Cl. X.R.

117—63, 135.5, 161 KP; 260—2.5 AT, 77.5 AM, 77.5 AT, 77.5 SP

UNITED STATES PATENT AND TRADEMARK OFFICE
CERTIFICATE OF CORRECTION

PATENT NO. : 3,793,238
DATED : February 19, 1974
INVENTOR(S) : Hans Dieter Winkelmann et al It is certified that error appears in the above-identified patent and that said Letters Patent are hereby corrected as shown below:

Column 2, line 13, "uretdione" should read ---uretdiones---

Column 1, line 51, "1,014,749" should read ---1,014,740---

Column 12, line 61, "amide" should read ---amine---

Column 14, line 25, "solution" should read ---solutions---

Column 15, line 69, "ploted" should read ---plotted---

Column 17, line 26, "equivalent" should read ---equivalents---

Column 19, line 15, "equivalent" should read ---equivalents---

Column 20, line 6, "equivalent" should read ---equivalents---

Column 21, line 17, "equivalent" should read ---equivalents---

Column 21, line 14, "equivalent" should read ---equivalents---

Column 22, line 33, "equivalent" should read ---equivalents---

Column 22, line 38, "equivalent" should read ---equivalents---

Column 25, line 1, "equivalent" should read ---equivalents---

Column 25, line 6, "equivalent" should read ---equivalents---

Column 25, line 9, "equivalent" should read ---equivalents"

Column 25, line 58, "equivalent" should read ---equivalents---

UNITED STATES PATENT AND TRADEMARK OFFICE
CERTIFICATE OF CORRECTION

PATENT NO. : 3,793,238
DATED : February 19, 1974
INVENTOR(S) : Hans Dieter Winkelmann et al It is certified that error appears in the above-identified patent and that said Letters Patent are hereby corrected as shown below:

Column 25, line 60, "equivalent" should read ---equivalents---

Column 26, line 30, "equivalent" should read ---equivalents---

Column 29, line 22, "equivalent" should read ---equivalents---

Column 29, line 26, "equivalent" should read ---equivalents---

Column 29, line 32, "equivalent" should read ---equivalents---

Column 29, line 56, "hexanel" should read ---hexane---

Column 29, line 61, "equivalent" should read ---equivalents---

Column 29, line 63, "equivalent" should read ---equivalents---

Column 29, line 67, "equivalent" should read ---equivalents---

Column 30, line 22, "equivalent" should read ---equivalents---

Column 30, line 27, "equivalent" should read ---equivalents---

Column 30, lines 28 and 29, "equivalent" should read ---equivalents---

Column 30, line 32, "equivalent" should read ---equivalents---

Column 30, line 56, "equivalent" should read ---equivalents---

Column 30, line 62, "equivalent" should read ---equivalents---

Column 30, line 63, two times "equivalent" should be ---equivalents---

UNITED STATES PATENT AND TRADEMARK OFFICE
CERTIFICATE OF CORRECTION

PATENT NO. : 3,793,238
DATED : February 19, 1974
INVENTOR(S) : Hans Dieter Winkelmann et al It is certified that error appears in the above-identified patent and that said Letters Patent are hereby corrected as shown below:

Column 30, line 67, "equivalent" should read ---equivalents---

Column 31, line 33, "equivalent" should read ---equivalents---

Column 31, line 40, two times, "equivalent" should read ---equivalents---

Column 32, line 47, "p-xylylene" should read ---xylylene---

Column 33, line 1, "equivalent" should read ---equivalents---

Column 33, line 4, "equivalent" should read ---equivalents---

Column 33, lines 7 and 8, "equivalent" should read ---equivalents---

Column 33, line 26, "16%1" should read ---16/1---

Column 33, line 41, two times, "equivalent" should read ---equivalents---

Column 33, line 44, "equivalent" should read ---equivalents---

Column 33, line 51, "equivalent" should read ---equivalents---

Signed and Sealed this

Twenty-fourth Day of August 1976

[SEAL]

Attest:

RUTH C. MASON
*Attesting Officer*

C. MARSHALL DANN
*Commissioner of Patents and Trademarks*